United States Patent
Kim et al.

(10) Patent No.: US 11,488,592 B2
(45) Date of Patent: Nov. 1, 2022

(54) COMMUNICATION ROBOT AND METHOD FOR OPERATING THE SAME

(71) Applicant: LG ELECTRONICS INC., Seoul (KR)

(72) Inventors: Sang Won Kim, Seoul (KR); Sun Chan Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 499 days.

(21) Appl. No.: 16/580,836

(22) Filed: Sep. 24, 2019

(65) Prior Publication Data

US 2020/0035237 A1 Jan. 30, 2020

(30) Foreign Application Priority Data

Jul. 9, 2019 (KR) ........................ 10-2019-0082619

(51) Int. Cl.
*A61H 23/02* (2006.01)
*G10L 15/22* (2006.01)
(Continued)

(52) U.S. Cl.
CPC ............. *G10L 15/22* (2013.01); *A61H 7/007* (2013.01); *A61H 9/0071* (2013.01); *A61H 15/0078* (2013.01); *A61H 99/00* (2013.01); *G06V 40/161* (2022.01); *G10L 15/08* (2013.01); *A61H 2201/501* (2013.01); *A61H 2201/5007* (2013.01); *A61H 2201/5041* (2013.01); *A61H 2201/5043* (2013.01); *A61H 2201/5046* (2013.01); *A61H 2201/5048* (2013.01); *A61H 2203/0431* (2013.01); *A61H 2230/805* (2013.01); *A61H 2230/825* (2013.01); *A61H 2230/855* (2013.01); *G10L 2015/088* (2013.01);
(Continued)

(58) Field of Classification Search
None
See application file for complete search history.

(56) References Cited

U.S. PATENT DOCUMENTS 9,401,144 B1 * 7/2016 Garber .................... G10L 15/08
10,343,287 B2 * 7/2019 Liu ........................ B25J 9/1656
(Continued)

FOREIGN PATENT DOCUMENTS

KR 10-1886627 B1 8/2018
KR 10-2018-0100280 A 9/2018

*Primary Examiner* — Seong-Ah A Shin
(74) *Attorney, Agent, or Firm* — Birch, Stewart, Kolasch & Birch, LLP

(57) ABSTRACT

A communication robot for operating a massage providing apparatus by executing an artificial intelligence algorithm (AI) and/or machine learning algorithm in a 5G environment connected for the Internet of things and a method for operating the communication robot are provided. The method for operating the communication robot may include acquiring a spoken utterance of a user positioned within a prescribed range from the massage providing apparatus, tracking a spoken utterance direction of the user from the spoken utterance of the user, orienting the communication robot towards the spoken utterance direction of the user, acquiring a voice command included in the spoken utterance in relation to operation of the massage providing apparatus, and operating the massage providing apparatus according to the voice command.

14 Claims, 9 Drawing Sheets

(51) Int. Cl.
  *G10L 15/08*   (2006.01)
  *A61H 15/00*   (2006.01)
  *A61H 9/00*    (2006.01)
  *A61H 7/00*    (2006.01)
  *A61H 99/00*   (2006.01)
  *G06V 40/16*   (2022.01)
  *H04W 84/04*   (2009.01)
  *H04L 67/12*   (2022.01)

(52) U.S. Cl.
  CPC ........ *G10L 2015/223* (2013.01); *H04L 67/12* (2013.01); *H04W 84/042* (2013.01)

(56) References Cited

U.S. PATENT DOCUMENTS

| | | | | |
|---|---|---|---|---|
| 11,301,266 | B2 * | 4/2022 | Woo | G06F 3/167 |
| 2002/0181773 | A1 * | 12/2002 | Higaki | G06V 40/20 |
| | | | | 715/863 |
| 2007/0172076 | A1 * | 7/2007 | Mori | H04R 3/12 |
| | | | | 381/77 |
| 2009/0018828 | A1 * | 1/2009 | Nakadai | G10L 15/20 |
| | | | | 704/E21.013 |
| 2009/0030552 | A1 * | 1/2009 | Nakadai | G10L 21/028 |
| | | | | 704/275 |
| 2010/0034397 | A1 * | 2/2010 | Nakadai | G01S 3/8006 |
| | | | | 381/58 |
| 2011/0077561 | A1 * | 3/2011 | Choly | G06F 3/04883 |
| | | | | 345/173 |
| 2014/0222436 | A1 * | 8/2014 | Binder | G10L 15/22 |
| | | | | 704/275 |
| 2016/0103202 | A1 * | 4/2016 | Sumiyoshi | G01S 5/18 |
| | | | | 367/118 |
| 2017/0133009 | A1 * | 5/2017 | Cho | G10L 15/22 |
| 2017/0266077 | A1 * | 9/2017 | Mackin | A61G 13/1235 |
| 2017/0330569 | A1 * | 11/2017 | Yoshikawa | G06F 3/167 |
| 2018/0122372 | A1 * | 5/2018 | Wanderlust | G10L 15/22 |
| 2018/0133101 | A1 * | 5/2018 | Inada | A61H 23/02 |
| 2018/0286432 | A1 * | 10/2018 | Shimada | G10L 15/24 |
| 2019/0046385 | A1 * | 2/2019 | Le | A61H 15/00 |
| 2020/0241683 | A1 * | 7/2020 | Le | A61H 15/0078 |

* cited by examiner

COMMUNICATION ROBOT AND METHOD FOR OPERATING THE SAME

CROSS-REFERENCE TO RELATED APPLICATION

This present application claims benefit of priority to Korean Patent Application No. 10-2019-0082619, entitled "COMMUNICATION ROBOT AND METHOD FOR OPERATING THE SAME," filed on Jul. 9, 2019, in the Korean Intellectual Property Office, the entire disclosure of which is incorporated herein by reference.

BACKGROUND

1. Technical Field

The present disclosure relates to a communication robot and a method for operating the same, and more particularly, to a communication robot for controlling operation of a massage providing apparatus and the communication robot through user's voice recognition using the communication robot and a method for operating the communication robot.

2. Description of Related Art

Massage chairs provide a massage to a user by using a special mechanism to relax stiff muscles or relieve fatigue and stress. Typical massage chairs are configured so that massage rollers or massage protrusions are arranged at positions corresponding to the neck, arms, back, waist, bottom, legs, etc. of a user, and the massage rollers or massage protrusions are controlled according to operation of a motor so as to provide a massage to the user.

Furthermore, massage chairs may be configured not only as a typical chair type but also as a sitting mat type so as to be movable, or may be configured as a car seat in which a massage mechanism is embedded.

Related art 1 discloses a massage chair having various functions such as a voice recognition function or the like to give convenience to a user.

Related art 2 discloses a massage chair apparatus which allows a user to adjust a massage pattern as desired using a control terminal connected to a network or the Internet of things.

However, related art 1 and related art 2 make it possible to execute a remote controller function for controlling a massage chair through voice recognition and a control terminal connected to a network or the Internet of things, but are unable to provide a user-customized control through communication with a user.

The above-described background art is technical information retained by the inventor to derive the present invention or acquired by the inventor while deriving the present invention, and thus should not be construed as publicly known art that was known prior to the filing date of the present invention.

SUMMARY OF THE INVENTION

An aspect of the present disclosure is to improve the performance of a communication robot and a massage providing apparatus by providing an optimized massage mode to a user by setting a massage mode of the massage providing apparatus through communication based on recognition of a voice of the user.

An aspect of the present disclosure is to set and operate a massage mode of a massage providing apparatus via a communication robot capable of interworking with the massage providing apparatus so as to improve user's satisfaction with the use of the massage providing apparatus and relieve a sense of boredom that may be given to the user while using the massage providing apparatus.

An aspect of the present disclosure is to improve user's satisfaction by giving a sense of affinity with a communication robot by directing a gaze of the communication robot according to the direction of a speech of the user and/or the face position of the user.

An aspect of the present disclosure is to set and operate a massage mode of a massage providing apparatus through recognition of a voice and/or gesture of a user so as to improve user's satisfaction and ease of use.

An aspect of the present disclosure is to improve the performance of a communication robot and improve user's satisfaction by activating the communication robot to perform an operation corresponding to a voice command even when the user is not sitting on a massage providing apparatus.

An aspect of the present disclosure is to provide a further optimized massage mode to a user to improve user's satisfaction with the use of a communication robot and a massage providing apparatus by recommending and setting a massage mode in which user's preference is reflected on the basis of user healthcare information and history information based on a manual operation signal from the user.

An aspect of the present disclosure is to improve user's satisfaction by recommending a user-customized massage mode on the basis of user preference and weather information.

An aspect of the present disclosure is to recommend a massage mode of a massage providing apparatus on the basis of at least one among user preference, travel information, traffic information, health information, and weather information in an autonomous vehicle, so as to improve user's satisfaction with the use of the massage providing apparatus and a communication robot and improve the usability of the massage providing apparatus and communication robot.

An aspect of the present disclosure is not limited to the above-mentioned aspects, and other aspects and advantages of the present disclosure, which are not mentioned, will be understood through the following description, and will become apparent from the embodiments of the present disclosure. Furthermore, it will be understood that aspects and advantages of the present disclosure can be achieved by the means set forth in the claims and combinations thereof.

A method for operating a communication robot according to an embodiment of the present disclosure may include controlling operation of the communication robot and a massage providing apparatus by recognizing a voice of a user using the communication robot.

In detail, a method for operating a communication robot according to an embodiment of the present disclosure may include acquiring a speech voice of a user positioned within a prescribed range from the massage providing apparatus, tracking a speech direction of the user from the speech voice of the user, orienting the communication robot towards the speech direction of the user, acquiring a voice command included in the speech voice in relation to operation of the massage providing apparatus, and operating the massage providing apparatus according to the voice command.

According to the method for operating a communication robot according to an embodiment of the present disclosure, a massage mode of a massage providing apparatus may be set and operated via the communication robot capable of interworking with the massage providing apparatus so as to improve user's satisfaction with the use of the massage providing apparatus.

The acquiring the speech voice may include acquiring, from the speech voice including a preset start word and the voice command, a voice that has uttered the start word.

The acquiring the voice command may include acquiring the voice command after utterance of the start word.

The performance of the communication robot and the massage providing apparatus and the user's satisfaction may be improved by providing an optimized massage mode to a user by setting a massage mode of the massage providing apparatus through communication based on recognition of a voice of the user through the acquiring the speech voice and the acquiring the voice command.

The orienting the communication robot may include directing a gaze of the communication robot towards the speech direction of user.

The operating the massage providing apparatus may include controlling the communication robot to gaze at a massage portion included in the voice command and operating the massage providing apparatus to massage the massage portion included in the voice command.

The controlling may include controlling the communication robot to recover an orientation of the communication robot after elapse of a fixed period of time during which the communication robot is oriented towards the massage portion.

According to the method for operating a communication robot according to an embodiment of the present disclosure, interaction between the user and the communication robot through communication is enabled by detecting the position of the user to direct the gaze of the communication robot towards the user and orienting the communication robot according to a command of the user through the orienting the communication robot and the operating and controlling the massage providing apparatus.

The method may include acquiring an image of the user positioned within the preset range from the massage providing apparatus, calculating a facial direction from the image of the user, and orienting the communication robot towards the facial direction of the user.

The method for operating a communication robot according to an embodiment of the present disclosure may improve user's satisfaction by giving a sense of affinity with the communication robot by directing the gaze of the communication robot according to the direction of a speech of the user and/or the face position of the user.

The method may include acquiring an image of a user's gesture of massaging a massage portion in relation to the operation of the massage providing apparatus, and operating the massage providing apparatus according to the image of the user's gesture.

The method may include acquiring, from the speech voice including a preset start word and the voice command, a voice that has uttered the start word before acquiring the image of the user's gesture.

The method for operating a communication robot according to an embodiment of the present disclosure may set and operate a massage mode of a massage providing apparatus through recognition of a voice and/or gesture of a user so as to improve user's satisfaction and ease of use.

A communication robot according to an embodiment of the present disclosure may include a first acquisition unit which acquires a speech voice of a user positioned within a prescribed range from the massage providing apparatus, and acquires a voice command included in the speech voice in relation to operation of the massage providing apparatus, an analysis unit which tracks a speech direction of the user from the speech voice of the user, a first operation control unit which orients the communication robot towards the speech direction of the user, and a second operation control unit which operates the massage providing apparatus according to the voice command.

A massage mode of a massage providing apparatus may be set and operated via the communication robot capable of interworking with a massage providing apparatus according to an embodiment of the present disclosure so as to improve user's satisfaction with the use of the massage providing apparatus and relieve a sense of boredom that may be given to the user while using the massage providing apparatus.

The first acquisition unit may acquire, from the speech voice including a preset start word and the voice command, a voice that has uttered the start word.

The first acquisition unit may acquire the voice command after utterance of the start word.

The performance of the communication robot and the massage providing apparatus and the ease of use may be improved by providing an optimized massage mode to a user by setting a massage mode of the massage providing apparatus through communication based on recognition of a voice of the user through the first acquisition unit according to an embodiment of the present disclosure.

The first operation control unit may direct a gaze of the communication robot towards the speech direction of the user.

The first operation control unit may control the communication robot to gaze at a massage portion included in the voice command, and the second operation unit may operate the massage providing apparatus to massage the massage portion included in the voice command.

The first operation control unit may control the communication robot to recover an orientation of the communication robot after elapse of a fixed period of time during which the communication robot is oriented towards the massage portion.

The performance of communication may be improved by directing the gaze of the communication robot according to a voice speech of a user through the first operation control unit and the second operation control unit according to an embodiment of the present disclosure.

The communication robot may include a second acquisition unit which acquires an image of the user positioned within the preset range from the massage providing apparatus. The analysis unit may calculate a facial direction from the image of the user, and the first operation control unit may orient the communication robot towards the facial direction of the user.

The performance of a communication robot and the user's satisfaction may be improved by activating the communication robot to perform an operation corresponding to a voice command regardless of whether or not the user is sitting on the massage providing apparatus through the second acquisition unit, the analysis unit, and the first operation control unit according to an embodiment of the present disclosure.

The second acquisition unit may acquire an image of a user's gesture of massaging a massage portion in relation to the operation of the massage providing apparatus, and the second operation control unit may operate the massage providing apparatus according to the image of the user's gesture.

The first acquisition unit may acquires, from the speech voice including a preset start word and the voice command, a voice that has uttered the start word before acquiring the image of the user's gesture.

The massage mode of the massage providing apparatus may be set and operated through recognition of a voice and/or gesture of a user by using the second acquisition unit, the second operation control unit, and the first acquisition unit according to an embodiment of the present disclosure, thereby improving user's satisfaction and ease of use.

In addition, other methods and other systems for implementing the present invention, and computer programs for executing the above method may be further provided.

BRIEF DESCRIPTION OF THE DRAWINGS

The above and other aspects, features, and advantages of the present disclosure will become apparent from the detailed description of the following aspects in conjunction with the accompanying drawings, in which.

DETAILED DESCRIPTION

Figure 1:
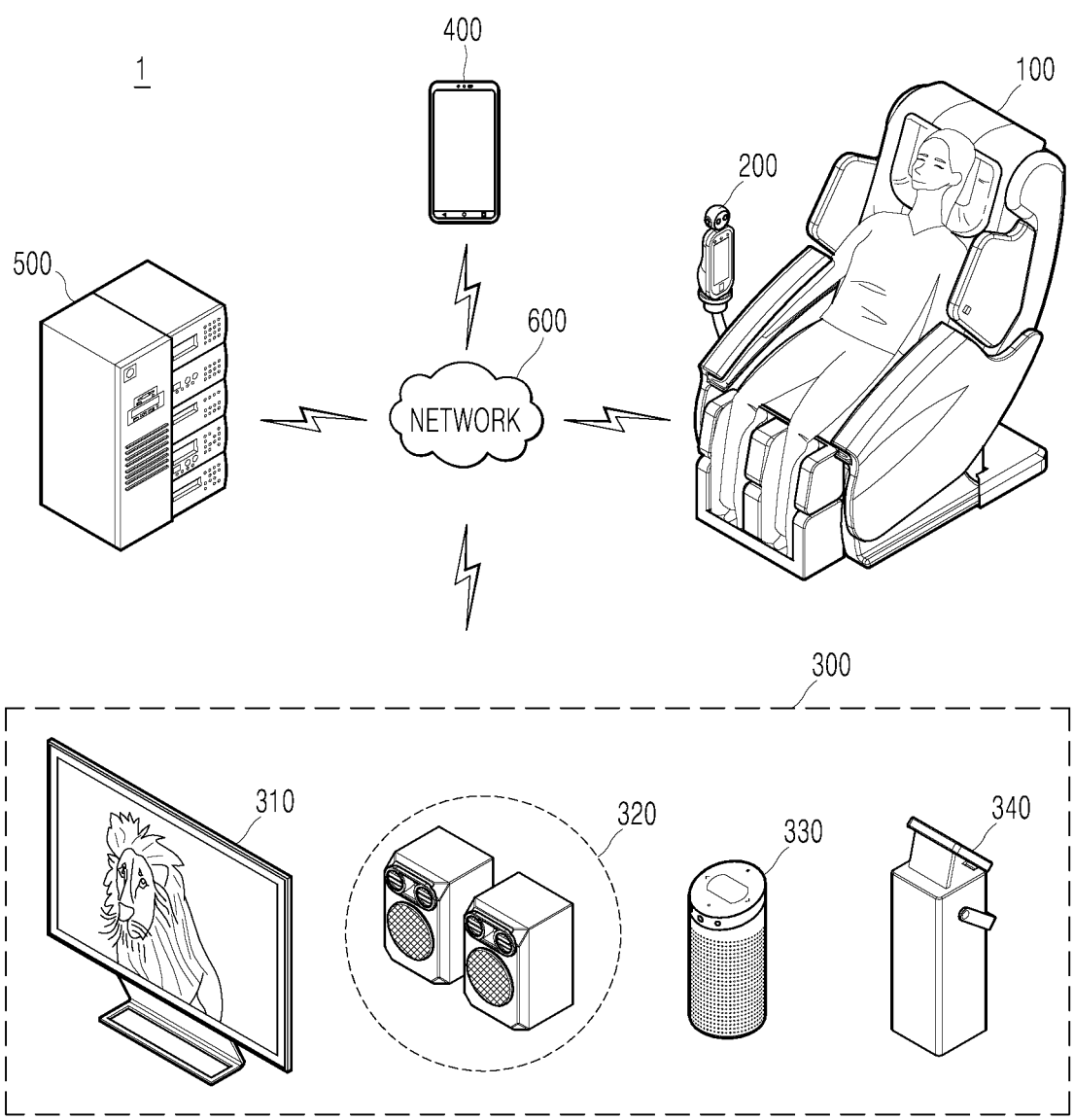
FIG. 1 is an exemplary diagram illustrating a massage providing environment including a massage providing apparatus, a communication robot, an output apparatus, a user terminal, a server, and a network for connecting the foregoing elements according to an embodiment of the present disclosure.

Advantages and features of the present disclosure and methods for achieving them will become apparent from the descriptions of aspects herein below with reference to the accompanying drawings. However, the present disclosure is not limited to the aspects disclosed herein but may be implemented in various different forms, and should be construed as including all modifications, equivalents, or alternatives that fall within the sprit and scope of the present disclosure. The aspects are provided to make the description of the present disclosure thorough and to fully convey the scope of the present disclosure to those skilled in the art. In relation to describing the present disclosure, when the detailed description of the relevant known technology is determined to unnecessarily obscure the gist of the present disclosure, the detailed description may be omitted.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. Although the terms first, second, etc. may be used herein to describe various elements, these elements should not be limited by these terms. These terms may be only used to distinguish one element from other elements.

Hereinafter, embodiments of the present disclosure will be described in detail with reference to the accompanying drawings. Like reference numerals designate like elements throughout the specification, and overlapping descriptions of the elements will not be provided.

FIG. 1 is an exemplary diagram illustrating a massage providing environment including a massage providing apparatus, a communication robot, an output apparatus, a user terminal, a server, and a network for connecting the foregoing elements according to an embodiment of the present disclosure.

Referring to FIG. 1, a massage providing environment 1 may include a massage providing apparatus 100, a communication robot 200, an output apparatus 300, a user terminal 400, a server 500, and a network 600.

The massage providing apparatus 100 may include a small tool for manually providing a massage, a partial massager for massaging arms, legs, neck, or the like, which are parts of a human body, and a massage seat and massage chair for massaging an entire body.

In the present embodiment, the massage providing apparatus 100 is exemplarily configured as a massage chair, and such the massage providing apparatus 100 may also be installed in an autonomous vehicle.

Furthermore, the massage providing apparatus 100 may be divided into a seat (not shown) that contacts a human body when a user is sitting and a massage driving unit (not shown) disposed in the seat to operate to provide a massage to the user.

The seat is divided into an upper end part, a seating part, and a lower end part according to locations on which a human body is placed. That is, the seat may include the upper end part having a shape surrounding a head of the user, the seating part having a shape on which the user can sit with its upper body leaning thereon, and the lower end part having a shape surrounding calves and feet of the user, so as to give a sense of comfort and relaxedness to the user. Here, a size and position of each part of the seat may be changed manually or automatically according to body characteristics of the user. Furthermore, the massage driving unit, which includes an actuator for providing a massage service, may massage an entire body of the user while varying positions and strengths according to a set massage mode by operating a massage roll or injecting air.

Furthermore, the massage providing apparatus 100 may include a sensor unit (not shown) to obtain body information about the user sitting on the massage providing apparatus 100. For example, the massage providing apparatus 100 may obtain height, weight, and skeletal position information, etc. about the user via the sensor unit. Furthermore, the massage providing apparatus 100 may detect a fingerprint to obtain registration information about the user, and may provide a service corresponding to the user.

In the present embodiment, the massage providing apparatus 100 may interwork with the communication robot 200, and may receive an input of a control command from the communication robot 200 so as to operate.

That is, the communication robot 200 may interwork with the massage providing apparatus 100 to obtain a speech of the user positioned within a preset range (e.g., 1 M) from the massage providing apparatus 100. Here, the fact that the user is positioned within the preset range from the massage providing apparatus may include the case where the user is sitting on the massage providing apparatus 100 and the case where the user is near the massage providing apparatus 100 without sitting on the massage providing apparatus 100. Furthermore, the communication robot 200 may track a speech direction of the user from the speech of the user so as to be oriented towards the speech direction, and may obtain a voice command included in the speech of the user in relation to operation of the massage providing apparatus 100 so as to operate the massage providing apparatus 100 according to the voice command.

Therefore, in the present embodiment, the communication robot 200 may replace a role of a remote controller for controlling the massage providing apparatus 100. However, in addition to the communication robot 200, the remote controller for controlling the massage providing apparatus 100 may be provided. Here, the communication robot 200 may interwork with the massage providing apparatus 100 wirelessly or by wire, and may be mounted on the massage providing apparatus 100 via a mounting unit of the massage providing apparatus 100 or may be positioned within a set range therefrom.

Here, the communication robot 200 may receive service request information from the user to control the massage providing apparatus 100. A method for the communication robot 200 to receive the service request information from the user may include the case of receiving a touch signal for a display unit (220 of FIG. 4) from the user, the case of receiving a speech corresponding to a service request from the user, and/or the case of generating a captured image of a motion (e.g., a gesture or the like for inducing activation of the communication robot 200) corresponding to the service request of the user. Here, a condition in which the communication robot 200 may receive the service request information from the user may include the case where the user is positioned within the preset range from the massage providing apparatus 100, and the communication robot 200 is positioned within the set range from the massage providing apparatus 100. Here, the preset range between the user and the massage providing apparatus 100 and the set range between the communication robot 200 and the massage providing apparatus 100 may represent preset values (region sizes), and the set range between the communication robot 200 and the massage providing apparatus 100 may be set smaller than or equal to the preset range between the user and the massage providing apparatus 100. Furthermore, a set distance between the communication robot 200 and the user may be set according to a maximum distance between the user and the massage providing apparatus 100 within the preset range between the user and the massage providing apparatus 100 and a maximum distance between the communication robot 200 and the massage providing apparatus 100 within the set range between the communication robot 200 and the massage providing apparatus 100. However, in the present embodiment, the set distance between the communication robot 200 and the user may be set to the maximum distance between the user and the massage providing apparatus 100.

Furthermore, the communication robot 200 that has received the service request information from the user may generate service response information corresponding thereto, and may output the service response information via the display unit and/or audio output unit (not shown). Furthermore, the communication robot 200 may transmit the service response information to the user terminal 400.

The communication robot 200 may interact with the user via emotional communication by a gaze, emotional expression, physical contact, etc. When the communication robot 200 receives a voice of the user or the user strokes a facial display unit (210 of FIG. 2) of the communication robot 200, the communication robot 200 may detect a facial expression of the user sitting on the massage providing apparatus 100, and may display various expressions such as joy, sorrow, anger, calm, or the like on a part corresponding to an eye of the facial display unit according to the detected facial expression of the user. Furthermore, the communication robot 200 may be configured so that a connection part between the facial display unit and a trunk part (240 of FIG. 3) may move back and forth and laterally, and thus the communication robot 200 may express various emotions such as affirmation, denial, or the like through a motion of nodding a head or a motion of shaking a head according to the voice and facial expression of the user. Furthermore, the communication robot 200 may be configured so that the trunk part may move back and forth and laterally and rotate, and thus may make various motions via communication with the user. Here, the communication with the user may represent a series of acts interacting with the user, i.e., a series of acts that allow the user to feel as if the user share emotions with the communication robot 200 by giving feedback in response to an act of the user.

Furthermore, in the present embodiment, the communication robot 200 may detect a position of the user to maintain a gaze directed towards the position of the user. For example, the communication robot 200 may maintain front sides of the facial display unit and trunk part (part corresponding to the eye of the facial display unit and a position in which a display unit is disposed) oriented towards the user, and may track the position of the user when the position of the user changes. Furthermore, even after the communication robot 200 changes the gaze direction into another direction other than the direction of the user in response to an arbitrary control command, the communication robot 200 may change the gaze direction back to the direction of the user when a certain period of time has elapsed. Here, the communication robot 200 may include a camera, wherein the camera may be oriented in the same direction as the gaze of the communication robot 200. The camera (not shown) may be included in the image recognition unit (233 of FIG. 4) described below, or may be a separate module.

Furthermore, in the present embodiment, the communication robot 200 may play back various pieces of content, may provide various pieces of information (e.g., weather, directions, fortune telling, etc.), and may remotely control various home appliances via the network 600.

Here, the term "content" may generally represent individual information elements or digital information including characters, symbols, voices, sounds, sound sources, images, moving pictures (video and audio), etc. accessible through the network 600. Such content may include, for example, data such as a text, image, moving picture, sound source, link (e.g., web link), etc. or a combination of at least two pieces of the data.

Furthermore, the communication robot 200 may be disposed in a predetermined space (e.g., a home, company, hospital, autonomous vehicle, or the like) together with the massage providing apparatus 100, and may search for at least one output apparatus 300, which is disposed in the same space as the communication robot 200 to output at least one among an audio signal and a video signal, may select at least one from among at least one found output apparatus 300, and may transmit at least one among an audio signal and a video signal to the selected output apparatus 300. Here, an operation mode of the communication robot 200 may include, for example, a call mode (voice call or video call) interworking with the user terminal 400, a content playback mode for playing back content, and an information providing mode for outputting information about a massage being performed by the massage providing apparatus 100.

Here, selecting the output apparatus 300 may include selecting any one output apparatus 300 for outputting caller information (a video signal, for example, an image of a caller, a name of the caller, a number of the caller, etc.), selecting any one output apparatus 300 for outputting a voice of the caller (an audio signal), or selecting any one output apparatus 300 for outputting the caller information and the voice of the caller during the call mode in which a call between the user and the caller is performed via the display unit and audio output unit of the communication robot 200.

Furthermore, selecting the output apparatus 300 may include selecting any one output apparatus 300 for outputting a video signal included in content, selecting any one output apparatus 300 for outputting an audio signal included in the content, or selecting any one output apparatus 300 for outputting the video signal and audio signal included in the content during the content playback mode in which arbitrary content selected by the user is played back via the display unit and audio output unit of the communication robot 200.

Furthermore, selecting the output apparatus 300 may include selecting any one output apparatus 300 for outputting massage information (a video signal, for example, a massage progress, a portion current being massaged, user body information, etc.), selecting any one output apparatus 300 for outputting a massage information voice (an audio signal), or selecting any one output apparatus 300 for outputting the massage information and the massage information voice during the information providing mode in which information about a massage being performed by the massage providing apparatus 100 is output via the display unit and audio output unit of the communication robot 200.

This output apparatus 300 may include an electronic device for outputting at least one among an audio signal and a video signal, for example, a TV 310, a two-channel speaker 320, an AI speaker 330, a beam projector 340, a built-in speaker (not shown), or the like. The output apparatus 300 is not limited to the above-mentioned electronic devices in the present embodiment, and thus may include a variety of home appliances (e.g., a washing machine, an air conditioner, a refrigerator, a cleaner, etc.).

At least one of the output apparatuses 300 may receive a control signal including output signal adjustment from the communication robot 200 to adjust the output sound volume of an audio signal to a volume greater or smaller than a current volume or to an off state. Furthermore, at least one among the output apparatuses 300 may receive a video signal from the communication robot 200 and may output the video signal, in response to a video signal output request from the communication robot 200. Furthermore, at least one among the output apparatuses 300 may receive an audio signal from the communication robot 200 and may output the audio signal, in response to an audio signal output request from the communication robot 200. Furthermore, at least one among the output apparatuses 300 may receive a video signal and an audio signal from the communication robot 200 and may output the video signal and the audio signal, in response to a video signal and audio signal output request from the communication robot 200.

The user terminal 400 may receive a service for driving or controlling the communication robot 200 through an authentication process after accessing a communication robot driving application or communication robot driving site. In the present embodiment, the user terminal 400 that has undergone the authentication process may drive the communication robot 200 and may control operation of the communication robot 200. Furthermore, in the present embodiment, the user terminal 400 may also receive a service for driving or controlling the massage providing apparatus 100 through an authentication process after accessing a massage providing apparatus driving application or massage providing apparatus driving site. Here, the user terminal 100 that has undergone the authentication process may drive the massage providing apparatus 100, and may control operation of the massage providing apparatus 100. That is, when receiving a service for driving or controlling the massage providing apparatus 100 via the user terminal 400, the massage providing apparatus 100 may be driven and operation of the massage providing apparatus 100 may be controlled via the communication robot 200 and the user terminal 400.

In the present embodiment, the user terminal 400 may be a desktop computer, smartphone, notebook, tablet PC, smart TV, cell phone, personal digital assistant (PDA), laptop, media player, micro server, global positioning system (GPS) device, electronic book terminal, digital broadcast terminal, navigation device, kiosk, MP3 player, digital camera, home appliance, and other mobile or immobile computing devices operated by the user, but is not limited thereto. Furthermore, the user terminal 400 may be a wearable terminal having a communication function and a data processing function, such as a watch, glasses, a hair band, a ring, or the like. The user terminal 400 is not limited to the above-mentioned devices, and thus any terminal that supports web browsing may be used as the user terminal 300.

The server 500 may be a database server, which provides big data required for applying a variety of artificial intelligence algorithms and data for operating the massage providing apparatus 100 and/or the communication robot 200. Furthermore, the server 500 may include a web server or application server for remotely controlling the massage providing apparatus 100 by using a massage providing apparatus driving application or massage providing apparatus driving web browser installed in the user terminal 400. Furthermore, the server 500 may include a web server or application server for remotely controlling the communication robot 200 by using a communication robot driving application or communication robot driving web browser installed in the user terminal 400.

Artificial intelligence is an area of computer engineering science and information technology that studies methods to make computers mimic intelligent human behaviors such as reasoning, learning, self-improving, and the like.

In addition, artificial intelligence (AI) does not exist on its own, but is rather directly or indirectly related to a number of other fields in computer science. In recent years, there have been numerous attempts to introduce an element of AI into various fields of information technology to solve problems in the respective fields.

Machine learning is an area of artificial intelligence that includes the field of study that gives computers the capability to learn without being explicitly programmed. More specifically, machine learning is a technology that investigates and builds systems, and algorithms for such systems, which are capable of learning, making predictions, and enhancing their own performance on the basis of experiential data. Machine learning algorithms, rather than only executing rigidly-set static program commands, may be used to take an approach that builds models for deriving predictions and decisions from inputted data.

The server 500 may receive service request information from the communication robot 200 to analyze the service request information, and may generate communication information corresponding to the service request information, i.e., service response information, to transmit the service response information to the communication robot 200. In particular, the server 500 may receive, from the communication robot 200, a speech corresponding to a service request of the user, and may generate a result of processing the speech as the communication information, i.e., the service response information, through a voice recognition process to provide the service response information to the communication robot 200. Here, according to a processing capability of the communication robot 200, the communication robot 200 may recognize and process the speech corresponding to the service request of the user, and may generate a result of the process as the communication information, i.e., the service response information. Furthermore, the server 500 may receive, from the communication robot 200, a speech corresponding to a service request of the user, and may generate a result of processing the speech as the communication information, i.e., the service response information, through a voice recognition process to provide the service response information to the massage providing apparatus 100.

Furthermore, in the present embodiment, the server 500 may receive, from the communication robot 200, a user gesture image corresponding to a service request of the user to analyze the user gesture image, and may generate a result of analyzing the user gesture image as the communication information, i.e., the service response information corresponding to a user gesture, to provide the service response information to the communication robot 200 and/or the massage providing apparatus 100.

The network 600 may serve to connect the massage providing apparatus 100, the communication robot 200, the output apparatus 300, the user terminal 400, and the server 500. The network 600 may include, for example, wired networks such as local area networks (LANs), wide area networks (WANs), metropolitan area networks (MANs), integrated service digital networks (ISDNs), and the like or wireless networks such as wireless LANs, CDMA, Bluetooth, satellite communication, and the like, but the scope of the present disclosure is not limited thereto. Furthermore, the network 600 may transmit/receive information using short-range communications and/or long-distance communications. Here, the short-range communications may include Bluetooth, radio frequency identification (RFID), infrared data association (IrDA), ultra-wideband (UWB), ZigBee, and wireless fidelity (Wi-Fi) technology, and the long-distance communications may include code division multiple access (CDMA), frequency division multiple access (FDMA), time division multiple access (TDMA), orthogonal frequency division multiple access (OFDMA), and single carrier frequency division multiple access (SC-FDMA) technology.

The network 600 may include a connection of network elements such as a hub, a bridge, a router, a switch, and a gateway. The network 600 may include one or more connected networks, for example, a multi-network environment, including a public network such as the Internet and a private network such as a secure corporate private network. Access to the network 600 may be provided via one or more wired or wireless access networks. Furthermore, the network 600 may support the Internet of things (IoT) for exchanging and processing information between distributed elements such as things or the like and/or 5G communication.

Figure 2:
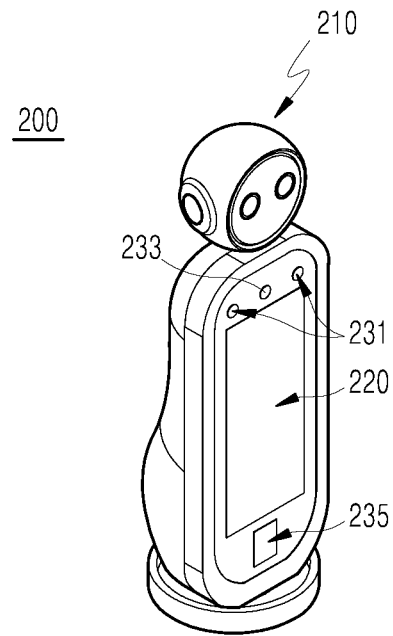
FIG. 2 is a diagram for schematically describing an outer appearance of a communication robot according to an embodiment of the present disclosure.
Figure 3:
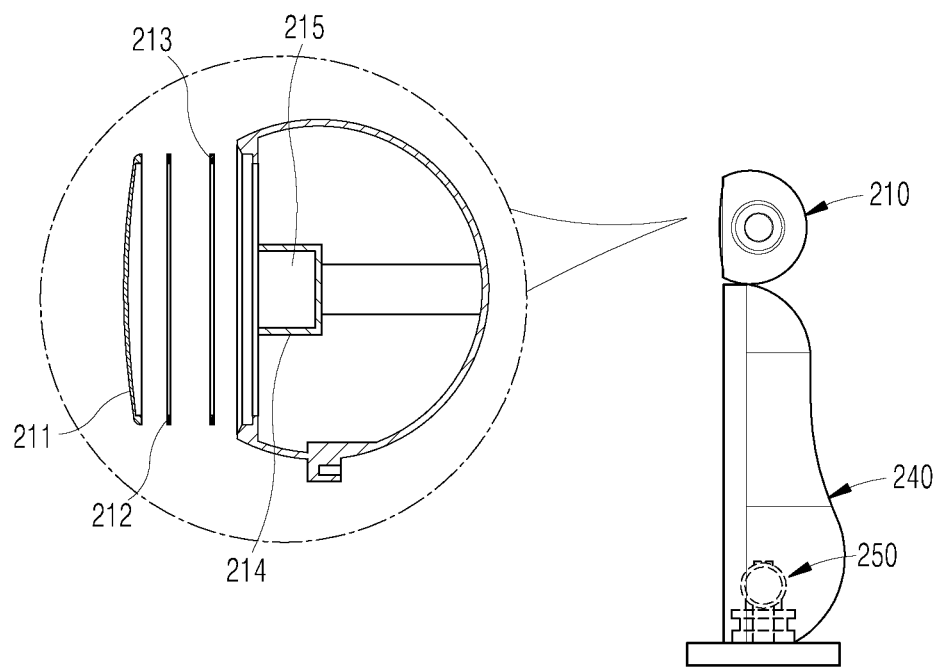
FIG. 3 is a diagram for schematically describing a mechanical structure of a communication robot according to an embodiment of the present disclosure.

FIG. 2 is a diagram for schematically describing an outer appearance of a communication robot according to an embodiment of the present disclosure, and FIG. 3 is a diagram for schematically describing a mechanical structure of a communication robot according to an embodiment of the present disclosure. Descriptions which overlap with the above descriptions related to FIG. 1 are not provided below.

Referring to FIGS. 2 and 3, the communication robot 200 may include an upper body and a lower body, wherein the upper body may form an upper part, i.e., a face, of the communication robot (200), and may be referred to as a facial display unit 210 in the present embodiment. Furthermore, the lower body may form a lower part, i.e., a trunk, of the communication robot 200, and may be referred to as a trunk part 240.

The facial display unit 210 may include a display cover 211 which protects inner parts and covers a surface of the facial display unit 210, and a PICTO film 212 which enables exhibition of various expressions like a human eye. Furthermore, the facial display unit 210 may include a diffusion sheet 213 for uniformizing brightness of light output from a light emitting element 215, a reflector 214 which serves as a reflection plate for concentrating a light ray on a specific region, and the light emitting element 215. Here, the light emitting element 215 may have a plurality of LED modules arranged in a lattice form, and various expressions may be output through the PICTO film 212 according to an output form of the light emitting element 215. Here, the PICTO film may refer to a film displaying pictograms. Pictograms may refer to a language system in which meaning is conveyed through pictorial representations of physical objects. In addition, in the present embodiment, the pictograms may refer to pictograms for expressing expressions through human eye shapes.

The trunk part 240 may include a display unit 220, a voice recognition unit 231, an image recognition unit 233, a biometric recognition unit 235, and a driving unit 250. This configuration may indicate that all or some of the display unit 220, the voice recognition unit 231, the image recognition unit 233, the biometric recognition unit 235, and the driving unit 250 may be arranged in a main body of the communication robot 220, which may be referred to as the trunk part 240, and the trunk part 240 may only represent a cover that forms a trunk of the communication robot 200.

Here, the communication robot 200 may provide a control panel 221 via the display unit 220, and may play back various pieces of content, may provide various pieces of information (e.g., massage information, user information, etc.), and may remotely control the massage providing apparatus 100 via the network 600. That is, the communication robot 200 may have the display unit 220 in the trunk part 240 to display a control mode (e.g., a massage mode, an operation mode, etc.) of the massage providing apparatus 100 and/or an operation state of the massage providing apparatus 100.

The voice recognition unit 231 may include a plurality of voice recognition microphone holes arranged on one side of the trunk part 240. Therefore, in the present embodiment, a speech utterance direction may be tracked through the plurality of voice recognition microphone holes. Furthermore, the image recognition unit 233 may include a camera module arranged on one side of the trunk part 240. Therefore, in the present embodiment, an image of a user face, gesture, or the like may be obtained via the camera. The biometric recognition unit 235 may represent a sensing unit for obtaining biometric information about the user, and may include, for example, a fingerprint scanner module or the like. In the present embodiment, user information may be obtained by recognizing a pre-registered user or detecting a biometric change of the user due to execution of a massage via the biometric recognition unit so as to provide a massage optimized for the user.

The driving unit 250 may include a motor for folding the trunk part 240 back and forth or laterally, and a motor for rotating the trunk part 240 by 360 degrees to change a direction. Although not illustrated in FIGS. 2 and 3, the driving unit 250 may also be provided to a connection part between the facial display unit 210 and the trunk part 240 so that the facial display unit 210 may be folded back and forth or laterally and may rotate by 360 degrees to change a direction.

Figure 4:
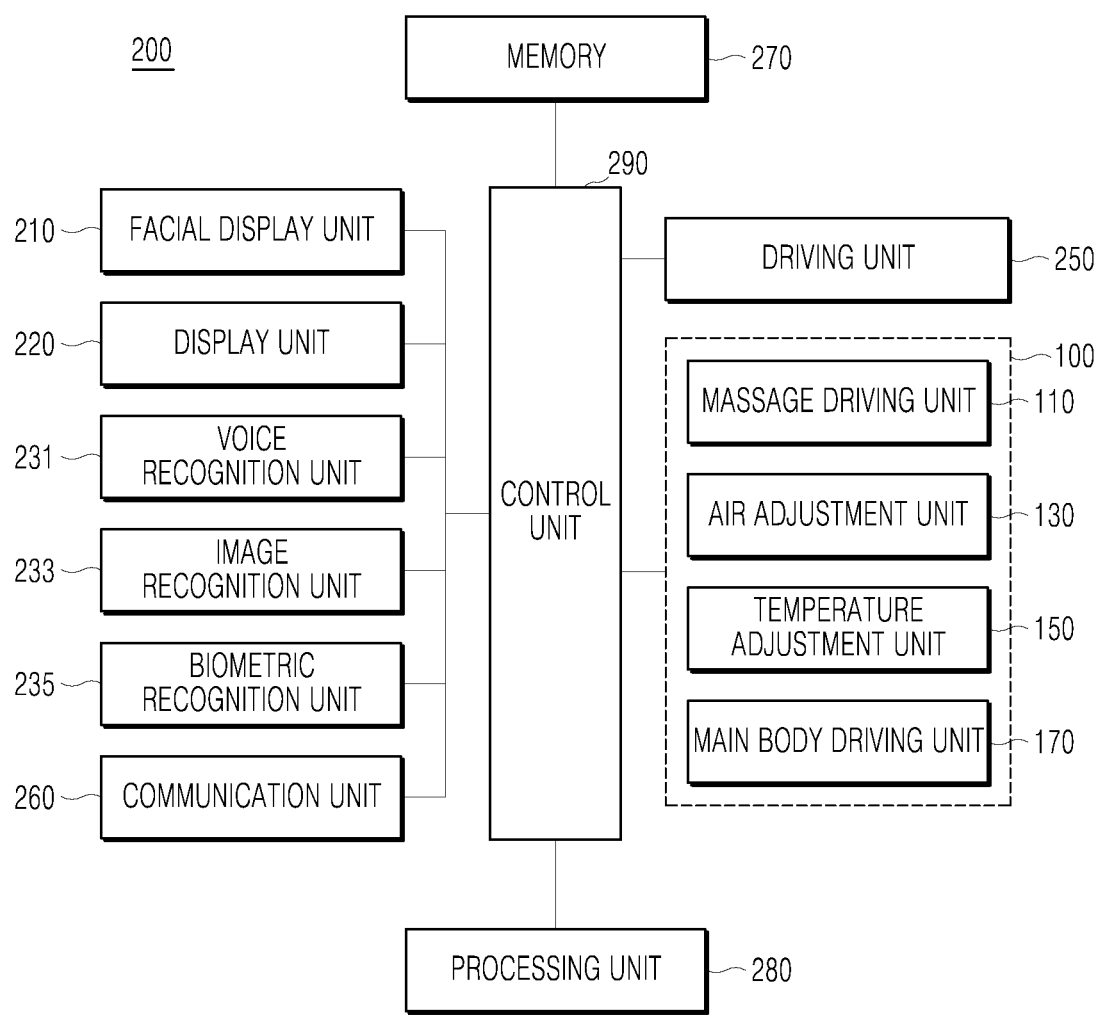
FIG. 4 is a schematic block diagram illustrating a communication robot according to an embodiment of the present disclosure.

FIG. 4 is a schematic block diagram illustrating a communication robot according to an embodiment of the present disclosure. Descriptions which overlap with the above descriptions related to FIGS. 1 to 3 are not provided below.

Referring to FIG. 4, the communication robot 200 may include the facial display unit 210, the display unit 220, the voice recognition unit 231, the image recognition unit 233, the biometric recognition unit 235, the driving unit 250, a communication unit 260, a memory 270, a processing unit 280, and a control unit 290.

The facial display unit 210 may represent an upper part, i.e., a face, of the communication robot 200, and may form, on a front side, an elliptical or circular shape similar to a human eye shape for emotional communication with the user via a gaze, emotional expression, or the like. The facial display unit 210 may display various expressions under control by the control unit 290. That is, the facial display unit 210 may display various expressions such as joy, sorrow, anger, calm, or the like through the elliptical or circular shape similar to a human eye shape in response to a user's touch, voice, or image (user facial expression, gesture, or the like). Furthermore, the facial display unit 210 may be provided with a camera to capture image of the user and surroundings. For example, the image recognition unit may be provided to a portion having the elliptical or circular shape similar to a human eye shape. The control unit 290 may control operation of the camera. Here, the camera may be included in the image recognition unit 233. Furthermore, although the image recognition unit 233 is illustrated as being positioned in the trunk part (240 of FIG. 3) in the present embodiment, the image recognition unit 233 may be positioned in the facial display unit 210, and may be positioned both in the facial display unit 210 and the trunk part.

Figure 5:
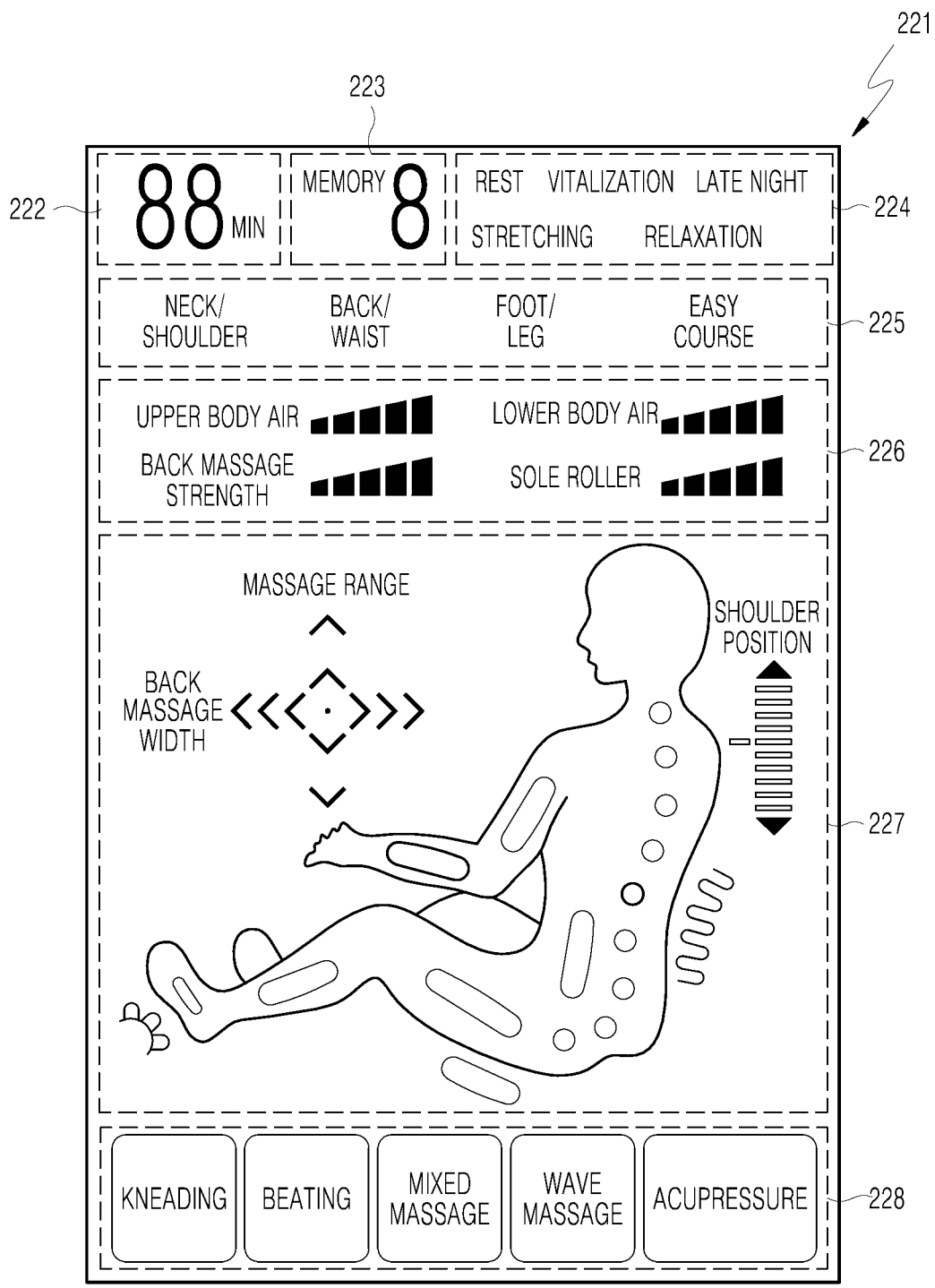
FIG. 5 illustrates an example the control panel displayed on the display unit of the communication robot of FIG. 4.

The display unit 220 may be arranged in a lower part, i.e., a trunk, of the communication robot 200, and may output information related to operation of the communication robot 200 as visual data under control by the control unit 290, and may display an operation state of the massage providing apparatus 100. FIG. 5 illustrates an example the control panel 221 displayed on the display unit 220.

Referring to FIG. 5, the control panel 221 may include an operation time display part 222 for displaying a massage execution time of the massage providing apparatus 100 and a user mode selection part 223 for selecting a massage mode stored in the memory 270. Here, in the present embodiment, an optimal automatic course setting desired by the user may be stored in the memory 270, and when the user selects the massage mode stored in the memory 270, the selected user mode may be displayed on the user mode selection part 223. Furthermore, the control panel 221 may include automatic massage course selection parts 224 and 225 for selecting an automatically set massage course such as a massage position, strength, etc. The automatic massage course may include, for example, a rest course, a vitalization course, a late-night course, a stretching course, a relaxation course, a neck/shoulder course, a back/waist course, and a leg/foot course. Here, when the user selects a desired course from the courses of the automatic massage course selection parts 224 and 225, the selected massage course may be displayed on the automatic massage course selection parts 224 and 225.

Furthermore, the control panel 221 may include a massage option adjustment part 226 for adjusting a massage option such as a massage strength or the like, a massage position adjustment part 227 for displaying a current massage position and allowing the user to minutely change the position to a desired position, and a manual massage course selection part 228 for selecting a massage operation. Here, the massage option adjustment part 226 may adjust, for example, an upper body air strength, a lower body air strength, a back massage strength, a sole roller massage strength, or the like, and the manual massage course selection part 228 may allow manual selection of a massage course such as kneading, beating, mixed massage, wave massage, acupressure, or the like.

Meanwhile, in the case where the control panel 221 is configured as a touch panel, the operation time display part 222, the user mode selection part 223, the automatic massage course selection parts 224 and 225, the massage option adjustment part 226, the massage position adjustment part 227, and the manual massage course selection part 228 are configured such that an item corresponding to a selection made in response to a touch input from the user is selected and set, and the selected item is displayed. In particular, the massage position adjustment part 227 outputs a human-like figure so as to assist the user to select a massage position more easily.

Furthermore, the display unit 220 may display health-related information such as information about effects depending on massaged portions and massage information suitable for user characteristics such as age, gender, or the like. In the present embodiment, the display unit 220 may perform not only a function of displaying a variety of information but also a function of an input unit for receiving an input of a predetermined control command so that the user may control overall operation of the massage providing apparatus 100. To this end, the display unit 220 may be configured with a touch-sensitive display controller or other various input/output controllers. For example, the touch-sensitive display controller may provide an output interface and an input interface between an apparatus and a user. The touch-sensitive display controller may transmit/receive electric signals to/from the control unit 290. Furthermore, the touch-sensitive display controller displays a visual output to the user, wherein the visual output may include a text, graphic, image, video, and a combination thereof. Such the display unit 220 may be a predetermined display member such as, for example, a touch-sensitive organic light emitting display (OLED), liquid crystal display (LCD), or light emitting display (LED). That is, the display unit 220 may form an inter-layer structure with a touch sensor or may be integrated with the touch sensor so as to be configured as a touch screen (not shown).

Furthermore, the present embodiment may include an output unit (not shown). The output unit may output information related to operation of the communication robot 200 as auditory data, tactile data, or the like, and may include an audio output unit and a haptic output unit (not shown). Furthermore, the audio output unit may output information related to operation of the communication robot 200 as audio data. In detail, in response to control by the control unit 290, the audio output unit may output a warning sound, a notification message pertaining to an operation mode, an operation state, an error state, or the like, information corresponding to a voice command of the user, a processing result corresponding to the voice command of the user, etc. in an audio form. The audio output unit may convert an electric signal received from the control unit 290 into an audio signal, and may output the audio signal. To this end, the audio output unit may be provided with a speaker (not shown) or the like. Furthermore, the audio output unit may output an audio signal (e.g., music playback, etc.) from a device capable of communicating with the communication robot 200 wirelessly or by wire.

The voice recognition unit 231 may receive an input of an uttered speech voice of the user. The voice recognition unit 231 may include a plurality of voice recognition microphone holes, and may receive an input of a speech voice uttered by the user towards the communication robot 200, under control by the control unit 290. The plurality of voice recognition microphone holes may be spaced apart from each other so as to be arranged at different positions, and may process a received speech voice of the user into an electric signal. Here, the voice recognition unit 231 may use various noise elimination algorithms to eliminate noise generated while receiving the speech voice of the user. In an optional embodiment, the voice recognition unit 231 may include various elements for processing a voice signal, such as a filter (not shown) for eliminating noise when receiving the speech voice of the user and an amplifier (not shown) for amplifying and outputting a signal output from the filter. In the present embodiment, the voice recognition unit 231 may track the speech direction of the user from the speech voice of the user so as to orient the communication robot 200 towards the speech direction of the user, and may obtain a voice command included in the speech voice of the user in relation to operation of the massage providing apparatus 100 so as to obtain a voice for operating the massage providing apparatus 100 according to the voice command.

The image recognition unit 233 may receive an input of an image signal, particularly, a user image and a surrounding image. The image recognition unit 233 may include a camera module, and may capture the user image and the surrounding image according to a driving mode and/or driving state of the communication robot 200 under control by the control unit 290. Furthermore, a plurality of image recognition units 233 may be installed for efficiency of image capturing. For example, the image recognition unit 233 may be installed in the display unit 220 under the display cover 211 of the facial display unit 210 so as to be invisible from the outside. This image recognition unit 233 may include an image sensor (e.g., a CMOS image sensor) including at least one optical lens and a plurality of photodiodes (e.g., pixels) for forming an image by light that has passed through the optical lens; and a digital signal processor (DSP) (not shown) for composing an image on the basis of signals output from the photodiodes. Furthermore, the image recognition unit 233 may generate not only still images but also moving pictures composed of frames of still images. Meanwhile, images obtained by the image recognition unit 233 may be stored in the memory 270. In the present embodiment, the image recognition unit 233 may calculate a facial direction of the user to orient the communication robot 200 towards a face of the user, and may capture an image for obtaining an image of a user's gesture of massaging a massage portion, in relation to operation of the massage providing apparatus 100.

The biometric recognition unit 235 may represent a sensing unit for sensing user information to provide an optimized massage mode and user-customized service to the user. That is, in the present embodiment, a health condition of the user, an emotional state of the user when the user is being massaged, and the like may be detected and analyzed via the biometric recognition unit 235, and an optimized massage mode may be learned and provided to the user by using the detected and analyzed health condition and emotional state. For example, when the user sits on the massage providing apparatus 100, a body shape of the user may be analyzed via the biometric recognition unit 235 to recommend a massage mode corresponding to the body shape, and a facial expression of the user may be analyzed via the biometric recognition unit 235 when the user is being massaged so as to recommend a massage mode for a facial expression classified as a positive expression. Meanwhile, data about the user health condition and user personal information may be directly input by the user using the user terminal 400, the control panel 221, and voice recognition via the voice recognition unit 231.

In more detail, the biometric recognition unit 235 may include various biometric sensors included in the communication robot 200 and the massage providing apparatus 100 capable of interworking with the communication robot 200, and sensing data of the biometric recognition unit 235 may be combined and analyzed. For example, the sensors provided to the massage providing apparatus 100 may include at least one among a weight detection sensor, an acceleration sensor, a gravity sensor (G-sensor), a gyroscope sensor, a motion sensor, an infrared (IR) sensor, a finger scan sensor, an ultrasonic sensor, an environment sensor (e.g., a barometer, a hygrometer, a thermometer, a radiation detection sensor, a thermal detection sensor, a gas detection sensor, etc.), and a chemical sensor (e.g., an electronic nose, a healthcare sensor, a biometric sensor, etc.).

Furthermore, the sensors provided to the communication robot 200 may include at least one among a lidar sensor, an illumination sensor, an acceleration sensor, a gravity sensor, a gyroscope sensor, a motion sensor, an RGB sensor, an infrared sensor, a finger scan sensor, an ultrasonic sensor, an optical sensor, an environment sensor, and a chemical sensor. Meanwhile, in the present embodiment, the massage providing apparatus 100 and the communication robot 200 may combine and use pieces of information sensed by at least two of the above sensors.

In order to proceed with an operation required or desired by the control unit 290, the driving unit 250 may receive a signal for the operation required or desired from the control unit 290 so as to allow the communication robot 200 to perform an operation such as changing of a direction. That is, a plurality of the driving units 250 may be provided, and may include a step motor, a BLDC motor, or the like.

The communication unit 260 may interwork with the network 600 to provide a communication interface required for providing, in a form of packet data, transmission/reception signals between the massage providing apparatus 100, the communication robot 200, the user terminal 400, and/or the server 500. Furthermore, the communication unit 260 may support a variety of object-to-object intelligent communication (Internet of things (IoT), Internet of everything (IoE), Internet of small things (IoST), etc.), and may support machine to machine (M2M) communication, vehicle to everything (V2X) communication, device to device (D2D) communication, etc.

The memory 270 may store information that supports various functions of the communication robot 200. The memory 270 may store a plurality of applications or application programs executed in the communication robot 200 and pieces of information and instructions for operating the communication robot 200. At least a portion of the application programs may be downloaded from an external server via wireless communication. Furthermore, the memory 270 may store user information about at least one user who is to interact with the communication robot 200. This user information may include face information, body shape information (e.g., image-captured by the image recognition unit 233 or the biometric recognition unit 235), voice information, etc. which may be used to identify a recognized user.

Furthermore, the memory 270 may store a start word for driving the communication robot 200, so that when the user utters the start word, the processing unit 280 may recognize the start word to change the communication robot 200 from a deactivated state to an activated state. Furthermore, the memory 270 may store information about a task to be performed by the communication robot 200 in response to a voice command (e.g., a speech voice that calls the communication robot 200, a command for controlling the massage providing apparatus 200, etc.) of the user. In the present embodiment, the memory 270 may store massage information about the massage providing apparatus 100 controllable via the communication robot 200, performance information and/or position information about the output apparatus 300, user characteristic information (e.g., facial information, voice information, etc.) for specifying a corresponding user, and a massage mode and massage option to be set for a specific user. Here, the performance information about the output apparatus 300 may include output strength information, channel number information, and other various pieces of information indicating output performance.

In the present embodiment, the memory 270 may perform a function of temporarily or permanently storing data processed by the control unit 290. Here, the memory 270 may include magnetic storage media or flash storage media, but the scope of the present disclosure is not limited thereto. This memory 270 may include an internal memory and/or an external memory, and may include a volatile memory such as a DRAM, SRAM, SDRAM, or the like, a non-volatile memory such as a one time programmable ROM (OTPROM), PROM, EPROM, EEPROM, mask ROM, flash ROM, NAND flash memory, NOR flash memory, or the like, and a storage device such as an HDD or a flash drive such as an SSD, compact flash (CF) card, SD card, micro-SD card, mini-SD card, Xd card, a memory stick, or the like.

Furthermore, although not illustrated in the drawings, a power supply unit (not shown) may be included. The power supply unit may be provided with external power or internal power under control by the control unit 290 to supply power to each element of the communication robot 200. This power supply unit may include a battery, wherein the battery may be configured as a built-in battery or a replaceable battery. The battery may be charged using a wired or wireless charging method, wherein the wireless charging method may include a magnetic induction method or a magnetic resonance method. In the present embodiment, the battery may include a rechargeable secondary battery such as a nickel-cadmium battery, a lead storage battery, a nickel metal hydride battery (NiMH), a lithium ion battery, a lithium polymer battery, or the like, but is not limited thereto. In the present embodiment, the control unit 290 may control charging/discharging of the battery, and may monitor state information about the battery to protect the battery. For example, the control unit 290 may execute an overcharge protection function, an over-discharge protection function, an overcurrent protection function, an overvoltage protection function, an overheating protection function, a cell balancing function, etc. for the battery. Furthermore, the control unit 290 may obtain a current, voltage, temperature, remaining capacity, life, state of charge (SOC), etc. of the battery. For example, although not illustrated in the drawings, the control unit 290 may use a sensing unit (not shown) to measure a voltage and temperature of the battery. When occurrence an abnormal situation such as overcharge, over-discharge, high temperature, or the like of the battery is detected, the control unit 290 may control charging/discharging of the battery to protect the battery.

When the processing unit 280 acquires a speech voice of the user positioned within the preset range from the massage providing apparatus 100, the processing unit 280 may execute a series of processes for providing a result of processing the speech voice as communication information, i.e., service response information, via a voice recognition process. The processing unit 280 may use an automatic voice recognition function for the voice recognition process. Furthermore, the processing unit 280 may track the speech direction of the user from the speech voice of the user, and may orient the communication robot 200 towards the speech direction of the user. Furthermore, the processing unit 280 may obtain a voice command included in the speech voice of the user in relation to operation of the massage providing apparatus 100 so as to operate the massage providing apparatus 100 according to the voice command. Furthermore, the processing unit 280 may acquire an image of the user positioned within the preset range from the massage providing apparatus 100, and may calculate the facial direction of the user to orient the communication robot 200 towards the facial direction of the user. Furthermore, the processing 280 may acquire an image of a user's gesture of massaging a massage portion in relation to operation of the massage providing apparatus 100, and may operate the massage providing apparatus 100 according to the image of the user's gesture.

For example, when the image of the user's gesture shows a motion of kneading a shoulder with a hand, parts of a shoulder portion of the massage providing apparatus 100 may be operated to mimic the motion in order to knead the shoulder of the user.

For another example, when the image of the user's gesture shows a motion of beating a thigh with a hand, parts of a thigh portion of the massage providing apparatus 100 may be operated to mimic the motion in order to beat the thigh of the user.

That is, a massage portion and the type of a massage operation may be determined according to a user's gesture by operating the massage providing apparatus 100 according to the image of the user's gesture.

In the present embodiment, the processing unit 280 may be provided outside the control unit 290 as illustrated in FIG. 4, or may be provided in the control unit 290 to operate like the control unit 290, or may be provided in the server 500 of FIG. 1. Detailed operation of the processing unit 280 will be described with reference to FIG. 6.

The control unit 290, which is a type of a central processing unit, may control overall operation of the communication robot 200 and the massage providing apparatus 100 by driving control software installed in the memory 270. In the present embodiment, the control unit 290 may set a massage mode and massage option of the massage providing apparatus 100 according to a voice command included in a speech voice of the user, and may control the massage providing apparatus 100 to operate according to the set massage mode.

To this end, the memory 270 may store a voice recognition algorithm, and may store a start word for driving the massage providing apparatus 100, so that when the user utters the start word, the control unit 290 may operate the voice recognition unit 231, and the voice recognition unit 231 may recognize the start word to change the communication robot 200 from a deactivated state to an activated state. After the communication robot 200 is changed to an activated state, the control unit 290 may recognize a voice command from the user via the voice recognition microphone holes, and may control operation of the communication robot 200 and the massage providing apparatus 100 according to the voice command. In the present embodiment, the voice recognition unit 231 may be separately provided outside the control unit 290, or may be included in the processing unit 280. Furthermore, the voice recognition unit 231 outside the control unit 290 illustrated in FIG. 4 may only represent a voice input unit for acquiring a voice, and a voice recognition processing unit for recognizing the voice acquired from the voice recognition unit 231 may be included in the processing unit 280.

The control unit 290 may control at least one among a massage driving unit 110, an air adjustment unit 130, a temperature adjustment unit 150, and a main body driving unit 170 of the massage providing apparatus 100. Furthermore, the control unit 290 may set a massage mode according to an image of a user's gesture of massaging a massage portion in relation to operation of the massage providing apparatus 100, and may control the massage providing apparatus 100 to operate according to the set massage mode. Furthermore, the control unit 290 may track the speech direction of the user from the speech voice of the user to orient the communication robot 200 towards the speech direction of the user. Furthermore, the control unit 290 may calculate the facial direction of the user from the image of the user to orient the communication robot 200 towards the face of the user.

Furthermore, in an optional embodiment, the control unit 290 may analyze a preference of the user on the basis of a manual operation signal of the user and user information detected via the biometric recognition unit 235, and may recommend a user-customized massage mode on the basis of a result of analyzing the preference of the user. Furthermore, the control unit 290 may recommend the user-customized massage mode on the basis of the result of analyzing the preference of the user and weather information.

Here, the control unit 290 may include any type of devices capable of processing data, such as a processor. Here, the term "processor" may represent, for example, a hardware-embedded data processing device having a physically structured circuit to execute functions expressed as instructions or codes included in a program. Examples of the hardware-embedded data processing device may include a microprocessor, a central processing unit (CPU), a processor core, a multiprocessor, an application-specific integrated circuit (ASIC), a field programmable gate array (FPGA), etc., but the scope of the present disclosure is not limited thereto.

In the present embodiment, the control unit 290 may perform machine learning such as deep learning or the like with regard to tracking of the speech direction of the user, acquisition of a voice command, operation of the communication robot 200 and the massage providing apparatus 100 (may include an operation mode other than a massage) corresponding to the voice command, operation of the communication robot 200 and the massage providing apparatus 100 (may include an operation mode other than a massage) corresponding to an image of a user's gesture, and recommendation of a user-customized massage mode, and the memory 270 may store data used in the machine learning, result data, etc.

A deep learning technology, which is a type of machine learning, may perform learning to a deep level in stages on the basis of data. The deep learning may represent a set of machine learning algorithms for extracting essential data from a plurality of pieces of data with an increase in stages.

A deep learning structure may include an artificial neural network (ANN), and may be configured with, for example, a deep neural network (DNN) such as a convolutional neural network (CNN), a recurrent neural network (RNN), a deep belief network (DBN), or the like. The deep learning structure according to the present embodiment may use various known structures. For example, the deep learning structure according to the embodiment of the present disclosure may include a CNN, RNN, DBN, or the like. The RNN, which is frequently used for processing natural language, is an efficient structure for processing time-series data that varies with time, and may constitute an artificial neural network by stacking layers up every moment. The DBN may include a deep learning structure configured by stacking multiple layers of restricted Boltzmann machine (RMB) that is a deep learning technique. When the number of layers reaches a certain number by repeating RBM learning, the DBN may have the certain number of layers. The CNN may include a model simulating a human brain function established on the assumption that when recognizing an object, a person extracts basic features of the objects, and then undergoes a complicated calculation in the brain to recognize the object on the basis of a result of the calculation.

Meanwhile, learning of an artificial neural network may be performed by adjusting a weight of a connection line (also adjusting a bias value if necessary) between nodes so that a desired output is achieved with regard to a given input. Furthermore, the artificial neural network may continuously update a weight value through learning. Furthermore, a method of back propagation or the like may be used in the learning of the artificial neural network.

That is, an artificial neural network may be installed in the communication robot 200, and the control unit 290 may include an artificial neural network, for example, a deep neural network (DNN) such as CNN, RNN, DBN, or the like. Therefore, the control unit 290 may learn a deep neural network for the tracking of the speech direction of the user, acquisition of a voice command, operation of the communication robot 200 and the massage providing apparatus 100 (may include an operation mode other than a massage) corresponding to the voice command, operation of the communication robot 200 and the massage providing apparatus 100 (may include an operation mode other than a massage) corresponding to an image of a user's gesture, and recommendation of a user-customized massage mode. Both unsupervised learning and supervised learning may be used as a machine learning method of the artificial neural network. The control unit 290 may control so as to update an artificial neural network structure after learning according to a setting.

Figure 6:
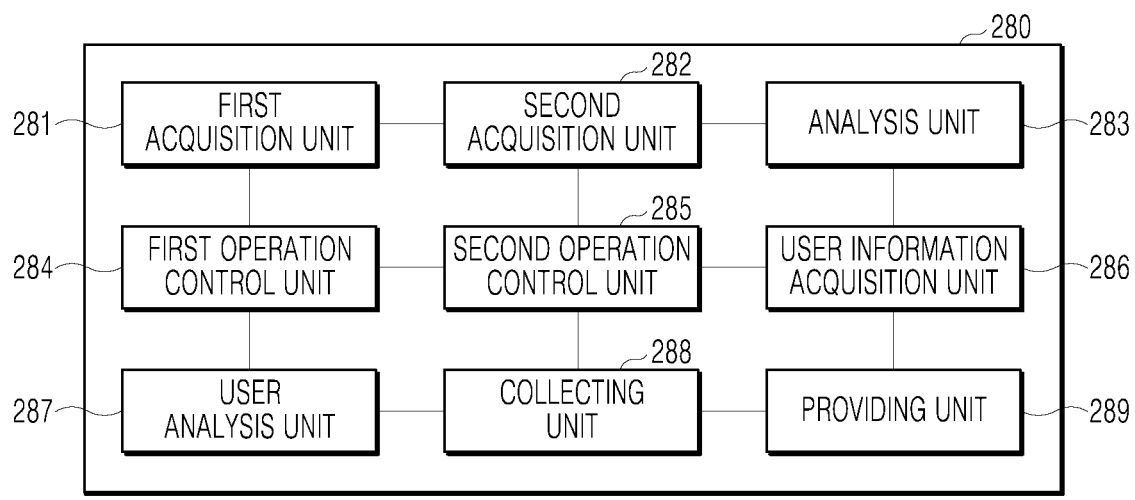
FIG. 6 is a schematic block diagram illustrating the processing unit of the communication robot of FIG. 4.

FIG. 6 is a schematic block diagram illustrating the processing unit of the communication robot of FIG. 4. Descriptions which overlap with the above descriptions related to FIGS. 1 to 5 are not provided below. Referring to FIG. 6, the processing unit 280 may include a first acquisition unit 281, a second acquisition unit 282, an analysis unit 283, a first operation control unit 284, a second operation control unit 285, a user information acquisition unit 286, a user analysis unit 287, a collecting unit 288, and a providing unit 289.

The first acquisition unit 281 may acquire a speech voice of the user positioned within the preset range from the massage providing apparatus 100, and may acquire a voice command included in the speech voice of the user in relation to operation of the massage providing apparatus 100. Here, the speech voice may include a start word and a user command. The start word, which is a specific command for activating a voice recognition function of the communication robot 200, may be referred to as a wake-up word. It is necessary to include the start word in the speech voice to activate the voice recognition function. When the start word is not included in the speech voice, the voice recognition function may be maintained in a deactivated state (e.g., a sleep mode). This start word may be preset and stored in the memory (270 of FIG. 4). Furthermore, the voice command may be a voice that may be substantially processed by the massage providing apparatus 100 and/or the communication robot 200 to generate an output. For example, when the speech voice of the user is "Hi LG, massage my shoulder", the start word may be "Hi LG", and the voice command may be "massage my shoulder". That is, the first acquisition unit 281 may acquire, from the speech voice including a preset start word and a voice command, the voice command after acquiring the voice that has uttered the start word. However, in the present embodiment, when it is detected that the user is sitting on the massage providing apparatus 100 or a fingerprint is sensed via the biometric recognition unit (235 of FIG. 4), the voice recognition function of the communication robot 200 may be activated without the start word.

Meanwhile, in the present embodiment, a voice recognition process may be executed by the voice recognition unit (231 of FIG. 4) or the first acquisition unit 281 in response to activation of the voice recognition function. Furthermore, when the voice recognition unit and the first acquisition unit 281 only collect a voice, the voice recognition process may be executed by the analysis unit 283. For example, the voice recognition process may include a process of analyzing a speech voice input through the voice recognition microphone holes and outputting a voice recognition result corresponding to an analysis result. In the present embodiment, an auto speech recognition (ASR) unit (not shown), a natural language understanding unit (not shown), a natural language generating unit (not shown), and a text-to-speech (TTS) unit (not shown) may be included to execute the voice recognition process. The auto speech recognition unit may convert a speech voice input through the voice recognition microphone holes into a text. For example, the auto speech recognition unit may include a speech recognition unit (not shown). The speech recognition unit may include an acoustic model and a language model. For example, the acoustic model may include vocalization-related information, and the language model may include unit phoneme information and information about a combination of the unit phoneme information. The speech recognition unit may convert a speech voice into a text using information about the unit phoneme information and vocalization-related information. Information about the acoustic model and language model may be stored, for example, an auto speech recognition database (not shown) in the auto speech recognition unit.

The natural language understanding unit may perform syntactic analysis or semantic analysis on a text output from the auto speech recognition unit to detect a speech intent of a speech voice. Here, the syntactic analysis may divide a preprocessing text into syntactic units (e.g., words, phrases, morphemes, etc.), and may recognize syntactic elements that the divided units have. The semantic analysis may be performed using semantic matching, rule matching, formula matching, or the like. Accordingly, the natural language understanding unit may recognize the intent of the preprocessing text or may acquire a parameter required for expressing the intent. The natural language generating unit may generate a text, in which the speech intent of the speech voice is reflected, as a text of a natural language speech form. The text-to-speech unit may convert the text of a natural language speech form generated by the natural language generating unit into speech information to output the speech information via an audio output unit or provide the speech information to the processing unit 280 and/or the control unit 290.

The second acquisition unit 282 may acquire an image of the user positioned within the preset range from the massage providing apparatus 100. Furthermore, the second acquisition unit 282 may acquire an image of a user's gesture of massaging a massage portion in relation to operation of the massage providing apparatus 100. In particular, the second acquisition unit 282 may acquire a user face region image from the image within the preset range from the massage providing apparatus 100. For example, the second acquisition unit 282 may correct illumination in the image within the preset range from the massage providing apparatus 100 and may detect a skin color region therefrom to primarily estimate a face region, and may confirm the face region through a face/eye region detection result. Furthermore, the second acquisition unit 282 may recognize a hand using feature points such as the color, shape, and brightness of the hand in the image within the preset range from the massage providing apparatus 100, and then may detect the shape of the hand through hand shape discrimination and modeling. That is, the gesture image may include an image about the position (coordinates) of a hand, the shape of a hand, and a movement trajectory (motion) of a hand, wherein the shape of a hand may include a body skeleton, a joint point, and a shape in which some of fingers are bent or spread out as in rock-paper-scissors game. Furthermore, the position of a hand may include the position of a body portion that may be massaged by the massage providing apparatus 100.

In the present embodiment, the speech voice of the user is acquired first via the first acquisition unit 281, and then the image of the user is acquired via the second acquisition unit 282, but the order of acquisition is not limited to the above order. Furthermore, in the present embodiment, the gesture image of the user is acquired after the first acquisition unit 281 acquires, from the speech voice including a preset start word and a voice command, a voice that has uttered the start word, but the order of acquisition is not limited to the above order.

The analysis unit 283 may track the speech direction of the user from the speech voice acquired by the first acquisition unit 281. For example, the analysis unit 283 may detect and track the direction of the speech voice of the user using the plurality of voice recognition microphone holes. For example, the analysis unit 283 may estimate the direction of the speech voice of the user using a time difference between signals arriving at two voice recognition microphone holes.

Furthermore, the analysis unit 283 may calculate a facial direction from the image of the user acquired by the second acquisition unit 282. That is, the analysis unit 283 may calculate the facial direction of the user using the user face region image from the second acquisition unit 282. Here, when the image recognition unit (233 of FIG. 4) and the second acquisition unit 282 only collect an image, a user face region calculation process may be executed by the analysis unit 283. Furthermore, the analysis unit 283 may analyze a gesture corresponding to gesture information preset to control operation of the communication robot 200 and/or the massage providing apparatus 100 from the user gesture image acquired by the second acquisition unit 282. For example, when a user's gesture of beating a shoulder is acquired via the second acquisition unit 282, the analysis unit 283 may analyze the user's gesture as a gesture corresponding to execution of a shoulder massage. Here, the gesture information preset to control operation of the communication robot 200 and/or the massage providing apparatus 100 may be stored in the memory (270 of FIG. 4), and may be updated by an input from the user.

The first operation control unit 284, which controls a direction change of the communication robot 200, may orient the communication robot 200 towards the speech direction of the user tracked by the analysis unit 283. That is, the first operation control unit 284 may direct the gaze of the communication robot 200 towards the speech direction of the user. Furthermore, the first operation control unit 284 may control the communication robot 200 to gaze at a massage portion included in a voice command. Here, the first operation control unit 284 may control the communication robot 200 to change the gaze direction back to an original gaze direction after elapse of a certain period of time during which the gaze of the communication robot 200 is directed to the massage portion.

Furthermore, after controlling the communication robot 200 to gaze at the massage portion included in the voice command, the first operation control unit 284 may analyze an image acquired by a camera oriented in the same direction as the gaze direction of the communication robot 200. Furthermore, the first operation control unit 284 may determine whether the massage portion is detected by analyzing the image acquired by the camera. Furthermore, when the massage portion is not detected from the acquired image, the first operation control unit 284 may generate an alarm. Here, the first operation control unit 284 may generate the alarm via the audio output unit. For example, when the user requests to massage a leg, the first operation control unit 283 may generate the alarm using a sound, vibration, or the like to induce the user to sit on a correct massage position if the leg of the user is not detected after controlling the communication robot 200 to gaze at the leg. Here, a known technology such as an image analysis algorithm or the like for recognizing an object may be used to detect a body portion in an image so as to determine whether a massage portion is detected, but an embodiment of the present disclosure is not limited to a specific technology.

Furthermore, the first operation control unit 284 may direct the gaze of the communication robot 200 towards the facial direction of the user calculated by the analysis unit 283. Here, the first operation control unit 284 may primarily direct the gaze of the communication robot 200 towards the speech direction of the user, and then may secondarily direct the gaze of the communication robot 200 towards the facial direction of the user. Furthermore, the first operation control unit 284 may direct the gaze of the communication robot 200 towards a direction finally determined by combining the facial direction and speech direction of the user acquired by the analysis unit 283. For example, when the user utters the wording "weaken the sole strength", the first operation control unit 284 may control the communication robot 200 to gaze at a sole and change the gaze direction back to an original gaze direction after elapse of a certain time.

That is, the first operation control unit 284 may direct the gaze of the communication robot 200 towards the user or massage portion via the driving unit 250. Furthermore, in the present embodiment, in the case where the communication robot 200 is mounted using the mounting unit of the massage providing apparatus 100, the mounting unit may be configured to be foldable or rotatable so that the first operation control unit 284 may direct the gaze of the communication robot 200 towards the user or massage portion by folding or rotating the mounting unit.

The second operation control unit 285, which operates the massage providing apparatus 100, may operate the massage providing apparatus 100 according to the voice command acquired by the first acquisition unit 281. That is, the second operation control unit 285 may operate the massage providing apparatus 100 to massage a massage portion included in the voice command. For example, when the user utters the wording "weaken the sole strength", the second operation control unit 285 may operate the massage providing apparatus 100 to massage a sole. Here, in the present embodiment, when the user utters the wording "weaken the sole strength", the first operation control unit 284 may direct the gaze of the communication robot 200 towards the sole, the second operation control unit 285 may operate the massage providing apparatus 100 to massage the sole, and then the first operation control unit 284 may control the communication robot 200 to change the gaze direction back to an original gaze direction.

Furthermore, the second operation control unit 285 may operate the massage providing apparatus 100 according to the image of the user's gesture acquired by the second acquisition unit 282. For example, when a user's gesture of beating a shoulder is acquired, the second operation control unit 285 may operate the massage providing apparatus 100 to massage a shoulder.

The user information acquisition unit 286 may acquire healthcare information about a health and emotion of the user via the image recognition unit (233 of FIG. 4) and the biometric recognition unit (235 of FIG. 4). Furthermore, the user information acquisition unit 286 may acquire history information including a massage mode set by receiving a manual operation signal from the user. That is, the user information acquisition unit 286 may obtain at least one among a cumulative usage amount, a cumulative usage period, and a cumulative number of times of operation change with regard to the massage modes of the user. For example, the user information acquisition unit 286 may obtain the history information indicating the number of times a preset massage mode has been performed, how many hours the corresponding massage mode has been performed, and the number of times the user has made a change in the preset massage mode. Furthermore, when the user manually operates using the control panel 221, the user information acquisition unit 286 may obtain a corresponding massage mode.

The user analysis unit 287 may analyze the preference of the user by using the healthcare information and the history information acquired by the user information acquisition unit 286. That is, the user analysis unit 287 may analyze the preference of the user by comparing a reference value with at least one among the cumulative usage amount, the cumulative usage period, and the cumulative number of times of operation change with regard to the massage mode included in the history information including the massage mode set by receiving a manual operation signal from the user and the healthcare information about the current health and emotion of the user acquired via the image recognition unit and the biometric recognition unit. Here, the reference value, which represents a reference value for determining the preference, may be set and stored in the memory 270 in a design stage, and may be changed by the user. For example, the user analysis unit 287 may analyze how many times the user has used each massage mode, which item has been manually changed in a corresponding massage mode, how many times the user has used a manually changed massage mode, etc. Furthermore, the user analysis unit 287 may analyze whether a facial expression of the user is positive or there is a positive physical change during a corresponding massage mode. This is because different massage modes are required to be set according to the preference of the user so as to reflect a level of satisfaction of an individual user. Furthermore, in the present embodiment, the preference of the user may be more accurately analyzed by using a health condition of the user, an emotional state of the user when the user is being massaged, and the like. Therefore, the user analysis unit 287 may analyze the preference of the user on the basis of at least one among the healthcare information and the history information so as to learn and provide a further optimized massage mode to an individual user.

Furthermore, in the present embodiment, a recommending unit (not shown) may be included, and the recommending unit may receive the result of analyzing the preference of the user from the user analysis unit 287 to recommend a user-customized massage mode. When recommending the user-customized massage mode, the recommending unit may combine the healthcare information and the history information stored in the memory 270. The recommending unit may learn, for example, a massage mode frequently selected by the user to generate a massage style that the user might like. That is, for example, when the health condition of the user is not good or the user likes a massage style in which a massage strength is low, the recommending unit may recommend a relatively static massage mode. Furthermore, the recommending unit may also recommend health-related information together with the user-customized massage mode. Furthermore, the recommending unit may receive a user's feedback (e.g., like, change, massage execution) for the user-customized massage mode displayed on the display unit 220, and the feedback may be used in learning of the control unit 290.

The collecting unit 288 may receive weather information from a weather server for providing the weather information. In one exemplary embodiment, the collecting unit 288 may collect the weather information by accessing the server 500, which stores the weather information collected from the weather server. Here, the weather information may include past, current, and future weather (e.g., cloudy, clear, rainy, snowy, etc.), temperature (minimum temperature, maximum temperature, average temperature, etc.), season information (spring, summer, autumn, winter), an air quality index, an ultraviolet index, a humidity index, an aridity index, etc. The recommending unit may recommend the user-customized massage mode on the basis of the result of analyzing the preference of the user from the user analysis unit 287 and the weather information collected by the collecting unit 288. For example, the recommending unit may recommend, for a rainy day, the massage mode selected by the user on a past humid day, or may recommend an optimum temperature for a massage according to an air temperature.

Furthermore, the collecting unit 288 may collect health information from a health server for providing the health information. In one exemplary embodiment, the collecting unit 288 may collect the health information by accessing the server 500, which stores the health information collected from the health server. Here, the health information may include health/disease information, symptom/sign information, and examination/treatment information according to age and gender. The recommending unit may recommend the user-customized massage mode on the basis of the result of analyzing the preference of the user from the user analysis unit 287 and the health information collected by the collecting unit 288. For example, the recommending unit may recommend the massage mode having a highest massage strength to a male in thirties.

The providing unit 289 may provide health/beauty information, music, news, etc. on the display unit 220. Furthermore, the providing unit 289 may provide a messenger notification or predetermined information so as to play music preferred by the user, or may recognize a speech voice from the user, for example, "how is the weather today", so as to provide today weather in response to the speech voice of the user.

Figure 7:
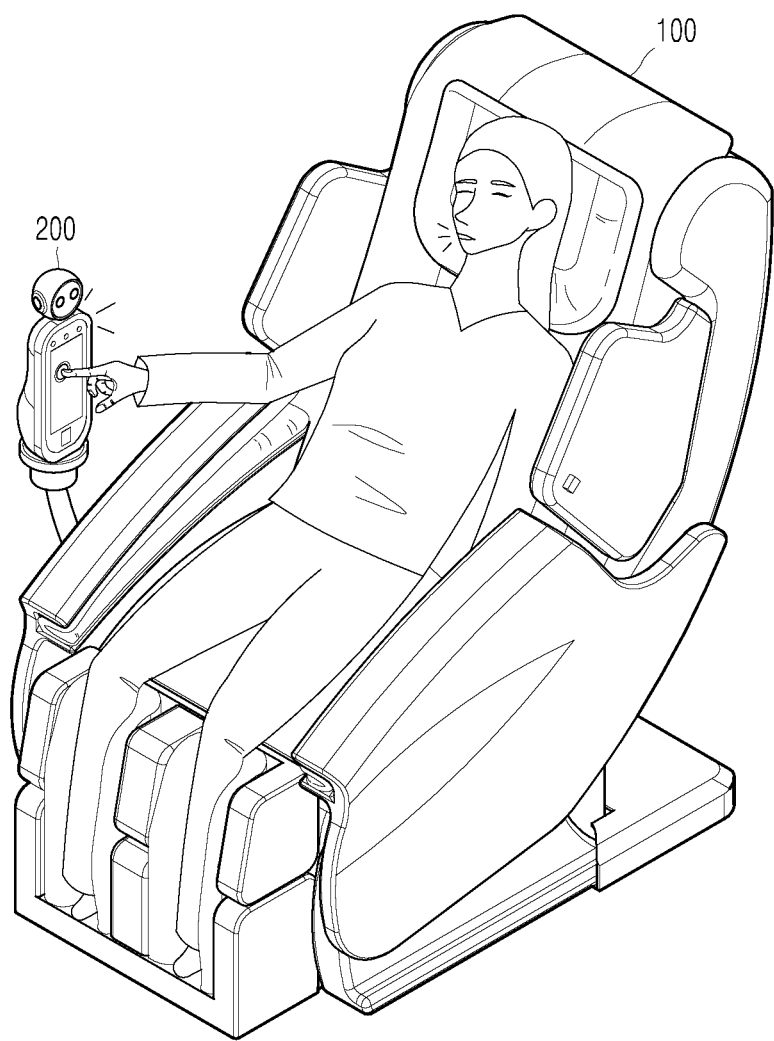
FIG. 7 is an exemplary diagram for describing a touch control of a communication robot according to an embodiment of the present disclosure.
Figure 8:
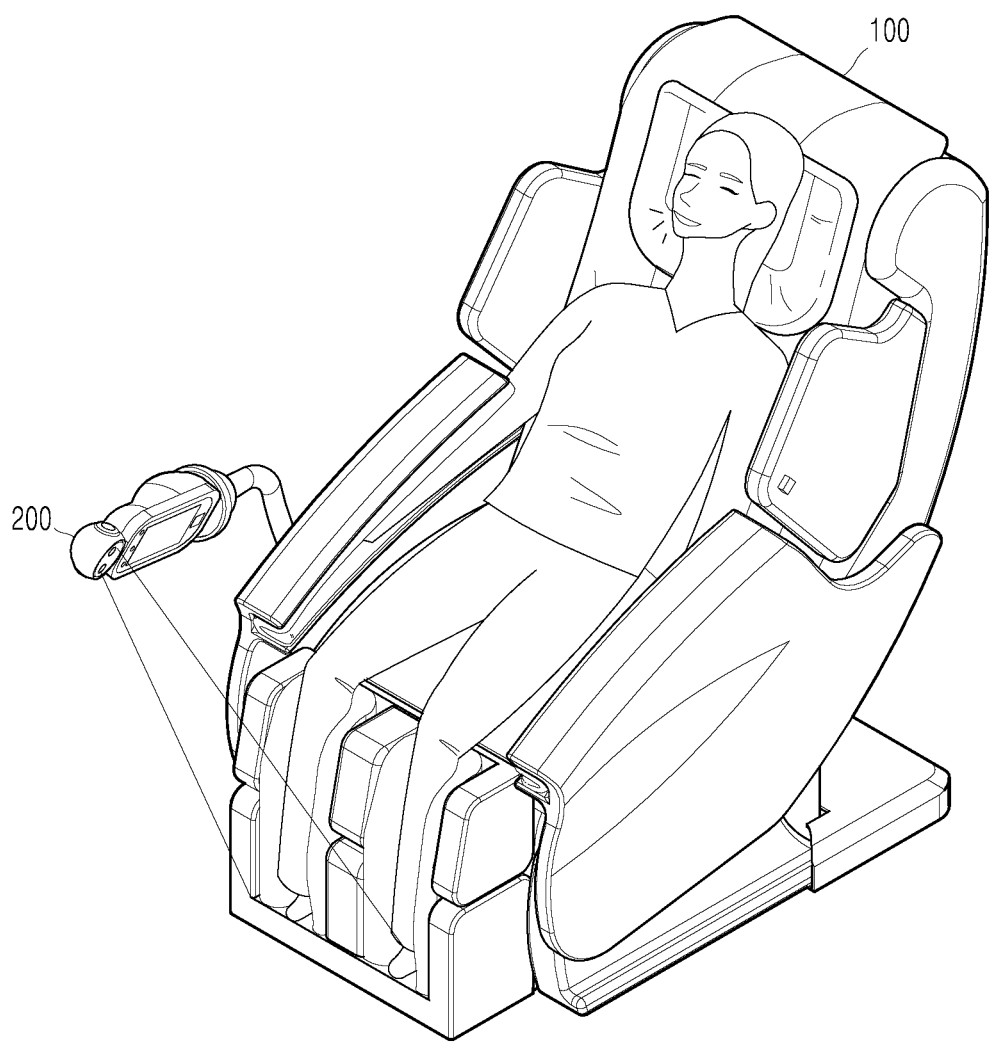
FIG. 8 is an exemplary diagram for describing a direction change operation of a communication robot according to an embodiment of the present disclosure.

FIG. 7 is an exemplary diagram for describing a touch control of a communication robot according to an embodiment of the present disclosure, and FIG. 8 is an exemplary diagram for describing a direction change operation of a communication robot according to an embodiment of the present disclosure. Descriptions which overlap with the above descriptions related to FIGS. 1 to 6 are not provided below.

Referring to FIG. 7, the user may sit on the massage providing apparatus 100 (locate within the preset range from the massage providing apparatus 100) interworking with the communication robot 200, and may operate the massage providing apparatus 100 via the communication robot 200. That is, the communication robot 200 may obtain a speech of the user sitting on the massage providing apparatus 100 to obtain a voice command included in the speech, and may operate the massage providing apparatus 100 according to the voice command. Here, in the present embodiment, the user may touch the control panel 221 of the display unit 220 to activate the massage providing apparatus 100. That is, when a user's touch input to the control panel 221 is detected, the communication robot 200 may perform an operation mode corresponding to the touch input. For example, the control panel 221 may display a user body shape including a massage portion, and the user may touch a massage portion desired by the user, such as a shoulder, in the user body shape. Here, the communication robot 200 may operate the massage providing apparatus 100 to massage the shoulder.

Referring to FIG. 8, the communication robot 200 may track the speech direction of the user from the speech of the user sitting on the massage providing apparatus 100, and may orient the communication robot 200 towards the speech direction of the user. That is, when the user utters the wording "massage the sole", the communication robot 200 may direct its gaze towards the sole.

Meanwhile, in an optional embodiment, the massage providing apparatus 100 and the communication robot 200 may be installed in an autonomous vehicle. Here, the massage providing apparatus 100 installed in an autonomous vehicle may be configured by providing a massage function to a seat of an existing vehicle, or may be configured as a typical massage chair type. Furthermore, in an optional embodiment, the communication robot 200 may recommend the massage mode on the basis of travel information and traffic information. To this end, the communication robot 200 may collect the travel information from the vehicle, and may collect the traffic information from a traffic server (not shown) for providing the traffic information. Here, the communication robot 200 may communicate with the traffic server via the network 600. Furthermore, in the case where the massage providing apparatus 100 and the communication robot 200 are arranged in an autonomous vehicle, the communication robot 200 may search for and select at least one output apparatus 300, which is disposed in the same space to output at least one among an audio signal and a video signal. Here, the output apparatus 300 may include an electronic device for outputting at least one among an audio signal and a video signal, for example, an in-vehicle speaker (not shown), the AI speaker 230, and an AVN device (not shown) such as a navigation device and a head-up display (HUD).

Meanwhile, in the present embodiment, the collecting unit 288 may collect the travel information from the vehicle, and may collect the traffic information from the traffic server for providing the traffic information. Here, the travel information may include a vehicle travel speed, travel mode, route guide information (e.g., remaining time to destination), and the like. Furthermore, the traffic information may include traffic situation information, information about an external environment in which the vehicle is travelling, and the like. Here, the information about an external environment in which the vehicle is travelling may include not only information about a road (expressway, national highway, general road, etc.) along which the vehicle is travelling but also weather information (weather, air temperature, season information, air quality index, ultraviolet index, humidity index, aridity index, etc.). The recommending unit may recommend the user-customized massage mode on the basis of the result of analyzing the preference of the user from the user analysis unit 287 and the travel information and traffic information collected by the collecting unit 288. For example, when traffic congestion occurs, the recommending unit may recommend the rest course to provide a comfortable massage, or may rather recommend the vitalization course to relieve a sense of boredom due to the traffic congestion.

Figure 9:
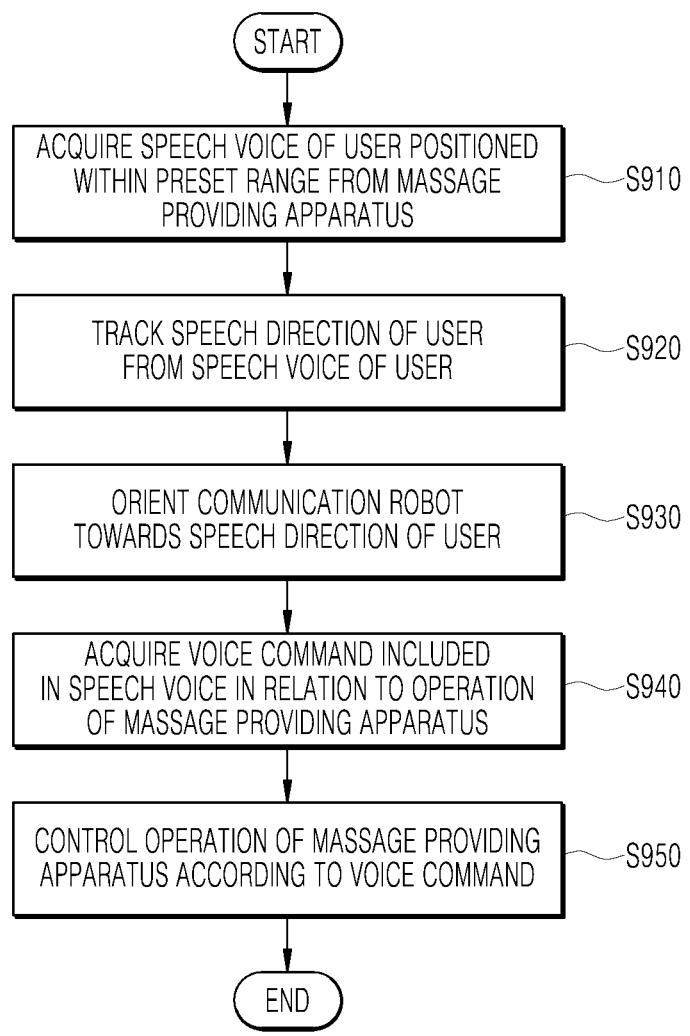
FIG. 9 is a flowchart illustrating a method for operating a communication robot according to an embodiment of the present disclosure.

FIG. 9 is a flowchart illustrating a method for operating a communication robot according to an embodiment of the present disclosure. Descriptions which overlap with the above descriptions related to FIGS. 1 to 8 are not provided below.

Referring to FIG. 9, in operation S901, the communication robot 200 acquires a speech voice of the user positioned within the preset range from the massage providing apparatus 100. Here, the speech voice may include a start word and a user command. The start word, which is a specific command for activating a voice recognition function of the communication robot 200, may be referred to as a wake-up word. It is necessary to include the start word in the speech voice to activate the voice recognition function. When the start word is not included in the speech voice, the voice recognition function may be maintained in a deactivated state (e.g., a sleep mode). For example, when the speech voice of the user is "Hi LG, massage my shoulder", the start word may be "Hi LG". That is, the communication robot 200 may acquire, from the speech voice including a preset start word and a voice command, the voice command after acquiring the voice that has uttered the start word.

In operation S920, the communication robot 200 tracks the speech direction of the user from the speech voice of the user. The communication robot 200, for example, may detect and track the direction of the speech of the user using a plurality of voice recognition microphone holes. For example, the communication robot 200 may estimate the direction of the speech of the user using a time difference between signals arriving at two voice recognition microphone holes.

In operation S930, the communication robot 200 directs the gaze of the communication robot 200 towards the speech direction of the user. The communication robot 200 may change the gaze direction of the communication robot 200 towards the speech direction of the user. Furthermore, the communication robot 200 may control the communication robot 200 to gaze at a massage portion included in a voice command. Here, the communication robot 200 may control the communication robot 200 to change the gaze direction back to an original gaze direction after elapse of a certain period of time during which the gaze of the communication robot 200 is directed to the massage portion. For example, when the user utters the wording "weaken the sole strength", the communication robot 200 may control the communication robot 200 to gaze at a sole and change the gaze direction back to an original gaze direction after elapse of a certain time. Here, the direction of the communication robot 200 may represent a direction in which the front side (gaze) of the communication robot 200 is oriented by rotating only the upper part (face part) of the communication robot 200 or rotating the lower part (trunk part). Furthermore, in the present embodiment, in the case where the communication robot 200 is mounted using the mounting unit of the massage providing apparatus 100, the mounting unit may be configured to be foldable or rotatable so that the gaze of the communication robot 200 may be directed towards the user or massage portion.

In operation S940, the communication robot 200 acquires a voice command included in the speech voice in relation to operation of the massage providing apparatus 100. The voice command may be a voice that may be substantially processed by the massage providing apparatus 100 and/or the communication robot 200 to generate an output. For example, when the speech voice of the user is "Hi LG, massage my shoulder", the voice command may be "massage my shoulder".

In operation S950, the communication robot 200 may control operation of the massage providing apparatus 100 according to the voice command. That is, the communication robot 200 may operate the massage providing apparatus 100 to massage a massage portion included in the voice command. For example, when the user utters the wording "weaken the sole strength", the communication robot 200 may operate the massage providing apparatus 100 to massage a sole. Here, in the present embodiment, when the user utters the wording "weaken the sole strength", the communication robot 200 may direct the gaze of the communication robot 200 towards the sole, and may operate the massage providing apparatus 100 to massage the sole, and then may control the communication robot 200 to change the gaze direction back to an original gaze direction.

Figure 10:
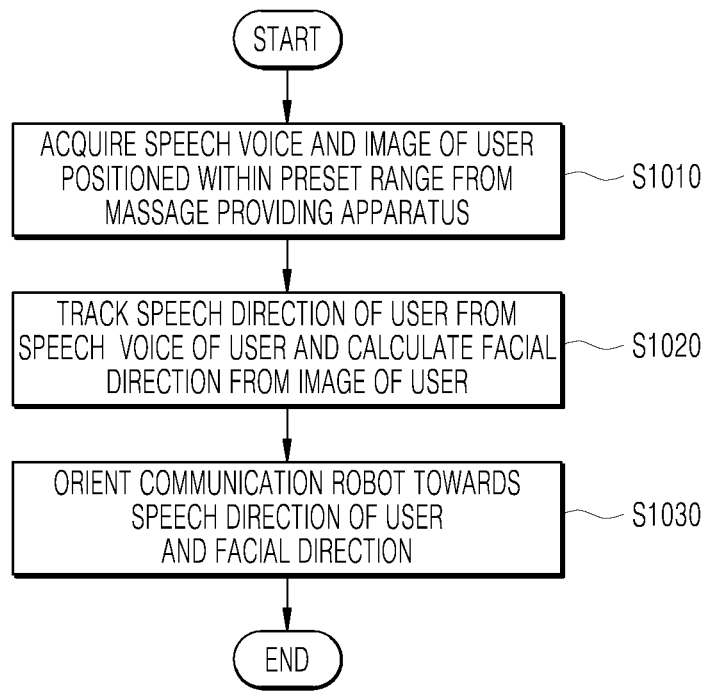
FIG. 10 is a flowchart illustrating a method for operating a communication robot based on a voice and image according to an embodiment of the present disclosure.

FIG. 10 is a flowchart illustrating a method for operating a communication robot based on a voice and image according to an embodiment of the present disclosure. Descriptions which overlap with the above descriptions related to FIGS. 1 to 9 are not provided below.

Referring to FIG. 10, in operation S1010, the communication robot 200 acquires a speech voice and image of the user positioned within the preset range from the massage providing apparatus 100. In particular, the communication robot 200 may acquire a user face region image from the image within the preset range from the massage providing apparatus 100. For example, the communication robot 200 may correct illumination in the image within the preset range from the massage providing apparatus 100 and may detect a skin color region therefrom to primarily estimate a face region, and may confirm the face region through a face/eye region detection result.

In operation S1020, the communication robot 200 tracks the speech direction of the user from the speech voice of the user and calculates the facial direction from the image of the user. The communication robot 200 may calculate the facial direction of the user using the user face region image.

In operation S1030, the communication robot 200 directs the gaze of the communication robot 200 towards the speech direction and facial direction of the user. Here, the communication robot 200 may primarily direct the gaze of the communication robot 200 towards the speech direction of the user, and then may secondarily direct the gaze of the communication robot 200 towards the facial direction of the user. Furthermore, the communication robot 200 may direct the gaze of the communication robot 200 towards a direction finally determined by combining the facial direction and speech direction of the user. Furthermore, the communication robot 200 may obtain a voice command included in the speech voice of the user in relation to operation of the massage providing apparatus 100, and may operate the massage providing apparatus 100 according to the voice command.

Figure 11:
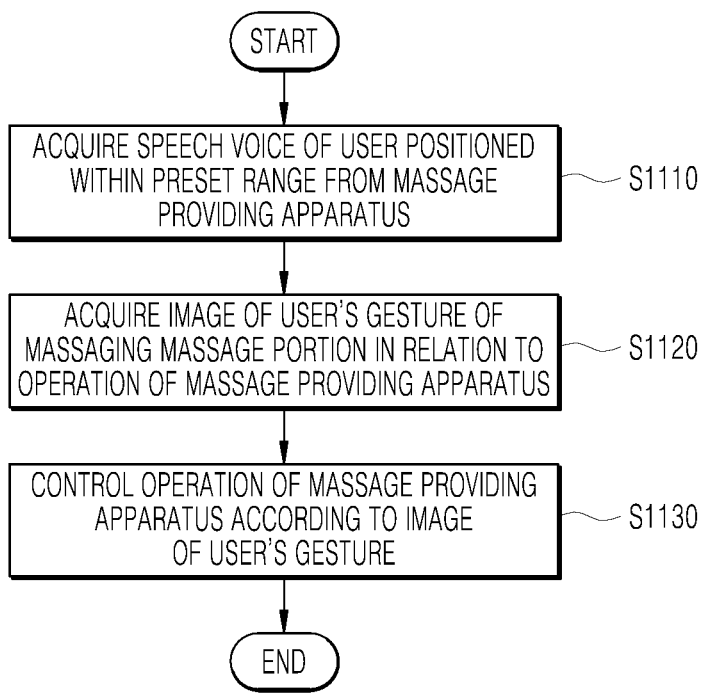
FIG. 11 is a flowchart illustrating a method for operating a communication robot based on a user gesture according to an embodiment of the present disclosure.

FIG. 11 is a flowchart illustrating a method for operating a communication robot based on a user gesture according to an embodiment of the present disclosure. Descriptions which overlap with the above descriptions related to FIGS. 1 to 10 are not provided below.

Referring to FIG. 11, in operation S1110, the communication robot 200 acquires a speech voice of the user positioned within the preset range from the massage providing apparatus 100.

In operation S1120, the communication robot 200 acquires an image of a user's gesture of massaging a massage portion in relation to operation of the massage providing apparatus 100. The communication robot 200 may recognize a hand using feature points such as the color, shape, and brightness of the hand in the image within the preset range from the massage providing apparatus 100, and then may detect the shape of the hand through hand shape discrimination and modeling. That is, the gesture image may include an image about the position (coordinates) of a hand, the shape of a hand, and a movement trajectory (motion) of a hand, wherein the shape of a hand may include a body skeleton, a joint point, and a shape in which some of fingers are bent or spread out as in rock-paper-scissors game. Furthermore, the position of a hand may include the position of a body portion that may be massaged by the massage providing apparatus 100.

In operation S1130, the communication robot 200 controls operation of the massage providing apparatus 100 according to the user gesture image. That is, the communication robot 200 may analyze a gesture corresponding to gesture information preset to control operation of the communication robot 200 and/or the massage providing apparatus 100 from the user gesture image. For example, when a user's gesture of beating a shoulder is acquired, the communication robot 200 may analyze the user's gesture as a gesture corresponding to execution of a shoulder massage, and may operate the massage providing apparatus 100 to massage a shoulder. Here, the gesture information preset to control operation of the communication robot 200 and/or the massage providing apparatus 100 may be stored in the memory (270 of FIG. 4), and may be updated by an input from the user.

According to an embodiment of the present disclosure, the performance of a communication robot and a massage providing apparatus may be improved by providing an optimized massage mode to a user by setting a massage mode of the massage providing apparatus through communication based on recognition of a voice of the user.

Furthermore, a massage mode of a massage providing apparatus is set and operated via a communication robot capable of interworking with the massage providing apparatus so as to improve user's satisfaction with the use of the massage providing apparatus and relieve a sense of boredom that may be given to the user while using the massage providing apparatus.

Furthermore, user's satisfaction may be improved by giving a sense of affinity with a communication robot by directing a gaze of the communication robot according to the direction of a voice speech of the user and/or the face position of the user.

Furthermore, a massage mode of a massage providing apparatus may be set and operated through recognition of a voice and/or gesture of a user so as to improve user's satisfaction and ease of use.

Furthermore, the performance of a communication robot and user's satisfaction may be improved by activating the communication robot to perform an operation corresponding to a voice command even when the user is not sitting on a massage providing apparatus.

Furthermore, a further optimized massage mode may be provided to a user to improve user's satisfaction with the use of a communication robot and a massage providing apparatus by recommending and setting a massage mode in which user's preference is reflected on the basis of user healthcare information and history information based on a manual operation signal from the user.

Furthermore, user's satisfaction may be improved by recommending a user-customized massage mode on the basis of user preference and weather information.

Furthermore, a massage mode of a massage providing apparatus may be recommended on the basis of at least one among user preference, travel information, traffic information, health information, and weather information in an autonomous vehicle, so as to improve user's satisfaction with the use of the massage providing apparatus and a communication robot and improve the usability of the massage providing apparatus and communication robot.

Although a communication robot is a product that is mass produced and uniform, a user recognizes a communication robot as a personalized apparatus, and thus an embodiment of the present disclosure may bring about the effect of providing a user-customized product.

The above-mentioned embodiments of the present disclosure may be implemented as a computer program executable by various components on a computer, and such the computer program may be recorded in a computer-readable medium. Here, the medium may include magnetic media such as hard discs, floppy discs, and magnetic tapes, optical media such as CD-ROM and DVD, magneto-optical media such as floptical disc, and hardware devices specially configured to store and perform program codes, such as ROM, RAM, and flash memory.

The computer program may be one specially designed and configured for the present disclosure, or may be one well known and available in the technical fields of computer software. Examples of the computer program may include not only machine language codes generated by compilers but also high-level language codes that can be executed by computers using interpreters.

The singular forms "a," "an" and "the" in this present disclosure, in particular, claims, may be intended to include the plural forms as well. Unless otherwise defined, the ranges defined herein is intended to include any invention to which values within the range are individually applied and may be considered to be the same as individual values constituting the range in the detailed description of the present invention.

Operations constituting the method of the present invention may be performed in appropriate order unless explicitly described in terms of order or described to the contrary. The present invention is not necessarily limited to the order of operations given in the description. The examples or exemplary terms (for example, "or the like", "and the like", "etc.") used herein are to merely describe the present invention in detail and not intended to limit the present invention unless defined by the following claims. Furthermore, those skilled in the art will readily appreciate that many alternation, combination and modifications, may be made according to design conditions and factors within the scope of the appended claims and their equivalents.

Therefore, the scope of the present disclosure is defined not by the detailed description, but by the claims and their equivalents, and all variations within the scope of the claims and their equivalents are to be construed as being included in the present disclosure.

What is claimed is:

1. A method of operating a communication robot configured to interwork with a massage providing apparatus, the method comprising:
    acquiring, by a controller, a spoken utterance of a user positioned within a predetermined range from the massage providing apparatus;
    tracking a spoken utterance direction of the user from the spoken utterance of the user;
    orienting the communication robot toward the spoken utterance direction of the user;
    acquiring a voice command included in the spoken utterance in relation to an operation of the massage providing apparatus; and
    operating the massage providing apparatus according to the voice command,
    wherein the method further includes, after acquiring the voice command and before operating the massage providing apparatus according to the voice command:
        acquiring an image of the user positioned within the predetermined range from the massage providing apparatus; and
        calculating a facial direction from the image of the user,
    wherein the operating the massage providing apparatus includes:
        controlling the communication robot to gaze at a massage portion included in the voice command; and
        operating the massage providing apparatus to massage the massage portion included in the voice command, and
    wherein the controlling the communication robot includes:
        determining a final direction of the communication robot's gaze based on the facial direction and a direction of the massage portion included in the voice command; and
        restoring the communication robot to a previous orientation of the communication robot after an elapse of a fixed period of time during which the communication robot is oriented toward the massage portion.

2. The method of claim 1, wherein a predetermined start word is included in a memory of the communication robot, and
    wherein the acquiring the spoken utterance includes detecting the start word in the spoken utterance.

3. The method of claim 2, wherein the acquiring the voice command occurs after detecting the start word.

4. The method of claim 1, wherein the orienting the communication robot includes directing a gaze of the communication robot toward the spoken utterance direction of the user.

5. The method of claim 1, further comprising:
    acquiring an image of a user's gesture of massaging a massage portion in relation to the operation of the massage providing apparatus; and
    operating the massage providing apparatus according to the image of the user's gesture.

6. The method of claim 5, wherein a predetermined start word is included in a memory of the communication robot,
    wherein the acquiring the spoken utterance includes detecting the start word in the spoken utterance, and
    wherein acquiring the image of the user's gesture occurs after detecting the start word.

7. A communication robot configured to interwork with a massage providing apparatus, the communication robot comprising:
    a memory storing one or more instructions; and
    one or more processors configured to execute the one or more instructions to:
        acquire a spoken utterance of a user positioned within a predetermined range from the massage providing apparatus,
        track a spoken utterance direction of the user from the spoken utterance of the user,
        orient the communication robot toward the spoken utterance direction of the user,
        acquire a voice command included in the spoken utterance in relation to an operation of the massage providing apparatus, and
        operate the massage providing apparatus according to the voice command, wherein the one or more processors are further configured to, after acquiring the voice command and before operating the massage providing apparatus according to the voice command:
    acquire an image of the user positioned within the predetermined range from the massage providing apparatus; and
    calculate a facial direction from the image of the user,
wherein the operating the massage providing apparatus includes:
    controlling the communication robot to gaze at a massage portion included in the voice command; and
    operating the massage providing apparatus to massage the massage portion included in the voice command, and
wherein the controlling the communication robot includes:
    determining a final direction of the communication robot's gaze based on the facial direction and a direction of the massage portion included in the voice command; and
    restoring the communication robot to a previous orientation of the communication robot after an elapse of a fixed period of time during which the communication robot is oriented toward the massage portion.

8. The communication robot of claim 7, further comprising a memory storing a predetermined start word,
wherein the one or more processors are further configured to detect the start word in the spoken utterance.

9. The communication robot of claim 8, wherein the one or more processors are further is configured to acquire the voice command after detecting the start word.

10. The communication robot of claim 7, wherein the one or more processors are further is configured to direct a gaze of the communication robot toward the spoken utterance direction of the user.

11. The communication robot of claim 7, wherein the one or more processors are further is configured to acquire an image of a user's gesture of massaging a massage portion in relation to the operation of the massage providing apparatus, and to operate the massage providing apparatus according to the image of the user's gesture.

12. The communication robot of claim 11, further comprising a memory storing a predetermined start word,
wherein the one or more processors are further configured to detect the start word in the spoken utterance, and to acquire the image of the user's gesture after detecting the start word.

13. A massage system comprising:
a massage providing apparatus; and
a communication robot configured to interwork with the massage providing apparatus, the communication robot including:
    a memory storing one or more instructions; and
    one or more processors configured to execute the one or more instructions to:
        acquire a spoken utterance of a user positioned within a predetermined range from the massage providing apparatus,
        track a spoken utterance direction of the user from the spoken utterance of the user,
        orient the communication robot toward the spoken utterance direction of the user,
        acquire a voice command included in the spoken utterance in relation to an operation of the massage providing apparatus, and
        operate the massage providing apparatus according to the voice command,
wherein the one or more processors are further configured to, after acquiring the voice command and before operating the massage providing apparatus according to the voice command:
    acquire an image of the user positioned within the predetermined range from the massage providing apparatus; and
    calculate a facial direction from the image of the user,
wherein the operating the massage providing apparatus includes:
    controlling the communication robot to gaze at a massage portion included in the voice command; and
    operating the massage providing apparatus to massage the massage portion included in the voice command, and
wherein the controlling the communication robot includes:
    determining a final direction of the communication robot's gaze based on the facial direction and a direction of the massage portion included in the voice command; and
    restoring the communication robot to a previous orientation of the communication robot after an elapse of a fixed period of time during which the communication robot is oriented toward the massage portion.

14. The massage system of claim 13, wherein the communication robot further comprises a memory storing a predetermined start word, and
wherein the one or more processors are further configured to detect the start word in the spoken utterance and to acquire the voice command after detecting the start word.

* * * * *